(12) United States Patent
Choi et al.

(10) Patent No.: US 9,207,514 B2
(45) Date of Patent: *Dec. 8, 2015

(54) ELECTROCHROMIC LITHIUM NICKEL GROUP 4 MIXED METAL OXIDES

(71) Applicant: Kinestral Technologies, Inc., South San Francisco, CA (US)

(72) Inventors: Hye Jin Choi, Berkeley, CA (US); Mark Bailey, Palo Alto, CA (US); John David Bass, San Francisco, CA (US); Stephen Winthrop von Kugelgen, Piedmont, CA (US); Eric Lachman, San Ramon, CA (US); Howard W. Turner, Campbell, CA (US); Julian P. Bigi, Berkeley, CA (US)

(73) Assignee: Kinestral Technologies, Inc., South San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/160,285

(22) Filed: Jan. 21, 2014

(65) Prior Publication Data

US 2014/0204444 A1   Jul. 24, 2014

Related U.S. Application Data

(60) Provisional application No. 61/754,953, filed on Jan. 21, 2013, provisional application No. 61/799,879, filed on Mar. 15, 2013.

(51) Int. Cl.
*G02F 1/153* (2006.01)
*G02F 1/15* (2006.01)

(52) U.S. Cl.
CPC ............ *G02F 1/1523* (2013.01); *Y10T 428/265* (2015.01)

(58) Field of Classification Search
USPC .................................. 359/265–291
See application file for complete search history.

(56) References Cited

U.S. PATENT DOCUMENTS

| | | | |
|---|---|---|---|
| 6,045,643 | A | 4/2000 | Byker et al. |
| 6,859,297 | B2 | 2/2005 | Lee et al. |
| 7,317,566 | B2 | 1/2008 | Tench et al. |
| 7,372,610 | B2 | 5/2008 | Burdis et al. |
| 7,820,296 | B2 | 10/2010 | Myli et al. |
| 8,717,658 | B2 | 5/2014 | Bergh et al. |
| 8,780,432 | B1 * | 7/2014 | Nguyen ................. 359/275 |
| 2002/0135881 | A1 | 9/2002 | Rukavina et al. |

(Continued)

FOREIGN PATENT DOCUMENTS

| WO | 2010100147 | 9/2010 |
|---|---|---|
| WO | 2012109494 | 8/2012 |

OTHER PUBLICATIONS

Skryabin et al., Testing and control issues in large area electrochromic films and devices, Electrochimica Acta, 1999, 44, 3203-3209, August.

(Continued)

*Primary Examiner* — Mohammed Hasan
(74) *Attorney, Agent, or Firm* — Womble Carlyle Sandridge & Rice LLP

(57) ABSTRACT

Multi-layer devices comprising a layer of an electrochromic lithium nickel oxide composition on a first substrate, the lithium nickel oxide composition comprising lithium, nickel and a Group 4 metal selected from titanium, zirconium, hafnium and a combination thereof.

27 Claims, 4 Drawing Sheets

(56) References Cited

U.S. PATENT DOCUMENTS

| | | |
|---|---|---|
| 2004/0150867 A1 | 8/2004 | Lee et al. |
| 2007/0053046 A1 | 3/2007 | Tench et al. |
| 2008/0212160 A1 | 9/2008 | Fanton et al. |
| 2010/0165440 A1 | 7/2010 | Nguyen et al. |
| 2010/0243427 A1 | 9/2010 | Kozlowski et al. |
| 2010/0245973 A1 | 9/2010 | Wang et al. |
| 2011/0151283 A1 | 6/2011 | Gillaspie et al. |
| 2011/0317243 A1 | 12/2011 | Piroux et al. |
| 2012/0081773 A1 | 4/2012 | Yeh et al. |
| 2012/0275008 A1 | 11/2012 | Pradhan et al. |
| 2014/0204445 A1 | 7/2014 | Choi et al. |
| 2014/0204446 A1 | 7/2014 | Choi et al. |
| 2014/0204447 A1 | 7/2014 | Choi et al. |
| 2014/0205746 A1 | 7/2014 | Choi et al. |
| 2014/0205748 A1 | 7/2014 | Choi et al. |
| 2014/0268286 A1 | 9/2014 | Choi et al. |
| 2014/0272394 A1 | 9/2014 | Choi et al. |

OTHER PUBLICATIONS

Patent Cooperation Treaty, International Search Report issued for PCT/US2012/024560, mailed Aug. 30, 2012, 2 pages.

Patent Cooperation Treaty, International Search Report issued for PCT/US2014/012341, mailed Apr. 29, 2014, 4 pages.

Moulki et al., Improved electrochromic performances of NiO based thin films by lithium addition: From single layers to devices, Electrochimica Acta, 2012, 74: 46-52.

Patent Cooperation Treaty, International Search Report issued for PCT/US2014/012347, mailed Apr. 29, 2014, 4 pages.

Avendano et al., Electrochromic materials and devices: Brief survey and new data on optical absorption in tungsten oxide and nickel oxide films, Thin Solid Films, 2006, 496: 30-36.

Patent Cooperation Treaty, International Search Report for PCT/US2014/012338, mailed May 16, 2014, 4 pages.

Patent Cooperation Treaty, International Search Report for PCT/US2014/012351, mailed May 12, 2014, 5 pages.

European Patent Office, Supplement European Search Report for EP12744192.1 dated Jul. 2, 2014, 9 pages.

Rubin et al., Electrochromic lithium nickel oxide by pulsed laser deposition and sputtering, Solar Energy Materials and Solar Cells, 1998, 54, 59-66, September.

Svegl et al., Electrochromic properties of lithiated Co-oxide ($Li_xCoO_2$) and Ni-oxide ($Li_xNiO_2$) thin films prepared by the sol-gel route, Solar Energy, 2000, 68, 523-540, September.

\* cited by examiner

ELECTROCHROMIC LITHIUM NICKEL GROUP 4 MIXED METAL OXIDES

FIELD OF THE INVENTION

The present invention generally relates to lithium nickel oxides comprising a Group 4 metal selected from titanium, zirconium and hafnium, and in one embodiment, lithium nickel oxide films comprising titanium, zirconium and/or hafnium for switchable electrochromic multi-layer devices.

BACKGROUND OF THE INVENTION

Commercial switchable glazing devices, also commonly known as smart windows and electrochromic window devices, are well known for use as mirrors in motor vehicles, aircraft window assemblies, sunroofs, skylights, and architectural windows. Such devices may comprise, for example, active inorganic electrochromic layers, organic electrochromic layers, inorganic ion-conducting layers, organic ion-conducting layers and hybrids of these sandwiched between two conducting layers. When a voltage is applied across these conducting layers the optical properties of a layer or layers in between change. Such optical property changes typically include a modulation of the transmissivity of the visible or the solar sub-portion of the electromagnetic spectrum. For convenience, the two optical states will be referred to as a bleached state and a darkened state in the following discussion, but it should be understood that these are merely examples and relative terms (i.e., a first one of the two states is more transmissive or "more bleached" than the other state and the other of the two states is less transmissive or "more darkened" than the first state) and that there could be a set of bleached and darkened states between the most transmissive state and the least transmissive state that are attainable for a specific electrochromic device; for example, it is feasible to switch between intermediate bleached and darkened states in such a set.

The broad adoption of electrochromic window devices in the construction and automotive industries will require a ready supply of low cost, aesthetically appealing, durable products in large area formats. Electrochromic window devices based on metal oxides represent the most promising technology for these needs. Typically, such devices comprise two electrochromic materials (a cathode and an anode) separated by an ion-conducting film and sandwiched between two transparent conducting oxide (TCO) layers. In operation, a voltage is applied across the device that causes current to flow in the external circuit, oxidation and reduction of the electrode materials and, to maintain charge balance, mobile cations to enter or leave the electrodes. This facile electrochemical process causes the window to reversibly change from a more bleached (e.g., a relatively greater optical transmissivity) to a more darkened state (e.g., a relatively lesser optical transmissivity).

TCO materials typically used in electrochromic windows such as FTO and ITO react with lithium at voltages below ~1V vs. Li/Li+, lowering their electrical performance and darkening the material. Electrolytes typically incorporated into the ion conductor, or the presence of water or protic impurities, have voltage stability windows between ~1 and ~4.5 V vs. Li/Li+. Therefore, it is beneficial to use electrode materials that undergo redox events within these limits. For example, tungsten oxide (WO3) is a well known cathodic electrochromic material that is bleached at ~3.2 V vs. Li/Li+ and darkens upon reduction, typically to ~2.3 V vs. Li/Li+. Consequently, electrochromic devices comprising a tungsten oxide cathode are common.

Certain nickel oxide and hydroxide based materials darken anodically to produce a darkened state transmission spectrum that is complementary to lithiated $WO_3$ and it is a popular target to partner $WO_3$ in electrochromic windows. Certain methods for the preparation of lithium nickel oxide films (LiNiOx) have been reported in the literature. These include sputter methods (see, e.g., Rubin et. al. Solar Energy Materials and Solar Cells 54; 998 59-66) and solution methods (see, e.g., Svegl et. al., Solar Energy V 68, 6, 523-540, 2000). In both cases the films exhibit high area charge capacity (>20 $mC/cm^2$), with bleached state voltages of ~1.5V. This bleached state voltage is relatively close to the reaction potential of lithium with typical TCO materials, the lower voltage limit of common electrolytes and the reaction potential required to over-reduce lithiated nickel oxides to nickel metal, a cathodic electrochromic reaction. The proximity of the bleached state voltage to such degrading mechanisms presents significant device control issues: methods will be required to consistently drive the device to the bleached state without driving the anode into damaging voltage regimes accommodating, for example, issues such as local electrode inhomogeneity. Furthermore, the bleached state lithiated nickel oxide cannot typically be handled in air without the material performance degrading. The lack of air stability of the bleached state of un-doped lithium nickel oxide films is demonstrated in the examples section of this invention where lithium nickel oxide films were prepared using liquid mixtures of lithium and nickel salts to produce, after thermal processing, films in their darkened state. Upon electrochemical or chemical reduction to their lithiated forms in an inert atmosphere bleached state films were produced but upon exposure to air in this bleached state they quickly lose the reversible electrochromic properties.

Examples of sputter coated lithiated nickel oxides that contain a second metal have been reported. For example, U.S. Pat. No. 6,859,297 B2 describes the lithiation (and bleaching) of mixed nickel oxide films that contain Ta and W in appreciable quantities. The material was prepared by a two step process, the first step being a vacuum co-sputtering process to produce a mixed Ta/Ni oxide film and second electrochemical lithiation step to produce a material in its bleached state. The Ta-containing oxide films are characterized extensively and have no long range order of evidence of crystallinity by XRD and, required handling in a controlled atmosphere to preclude their exposure to water and oxygen.

A wide range of structures derive from metal occupation of the octahedral and tetrahedral sites within close packed anion arrays. In such arrays, there are equal numbers of octahedral sites as anions and twice as many tetrahedral sites as anions. The term "rock salt" as used herein describes a cubic structure in which metal cations ("M") occupy all of the octahedral sites within a close packed anion array, resulting in the stoichiometry MO. Furthermore, the metals are indistinguishable from one another regardless of whether the metals are the same element or a random distribution of different elements. In the specific case of NiO, for example, the cubic rock salt unit cell has a ~4.2 Å and a largest d-spacing of ~2.4 Å. In the case where there is more than one type of metal, different structures are created depending upon how and if the metals order themselves over the octahedral and tetrahedral holes. The case of $Li_xNi_{1-x}O$ is instructive: for all values of x, the oxygen anions are close packed and the metals are arranged on the octahedral sites. For values of x less than ~0.3, the lithium and nickel cations are randomly arranged; for values of x greater than 0.3, the metals segregate to create nickel-rich and lithium-rich layers, creating layered structures with hexagonal symmetry. The end member, $Li_{1/2}Ni_{1/2}O$ (equivalently, $LiNiO_2$) is formed from alternate layers of —Ni—O—Li—O— with a hexagonal unit cell (a=2.9, c=14.2 Å) and a largest d-spacing of ~4.7 Å. The voltage associated with the lithium intercalation events is above 3V vs. Li/Li+.

Even though all of the octahedral sites in $LiNiO_2$ are full, additional lithium can be inserted into the material, forming $Li_{1+x}NiO_2$. The additional lithium necessarily occupies sites in close proximity to other cations with less shielding from the anion array. Thus, the insertion of this additional lithium occurs at lower voltages, <2V vs. Li/Li+ for bulk phase materials.

Other phases that are possible from metal occupation of sites within close-packed oxygen arrays include the orthorhombic phases $Li_{1/2}Ni_{1/3}Ta_{1/6}O$ and $Li_{1/2}Ni_{1/3}Nb_{1/6}O$ in which the Nb or Ta segregate to one set of octahedral sites and the Ni and Li are mixed on the remaining sites. Further examples are the spinel phases including $Li_{1/4}Mn_{3/8}Ni_{1/8}O$ in which Mn and Ni occupy the octahedral sites and Li occupies ¼ of the tetrahedral sites.

A collective signature of all of the phases described above are the close packed layers. In the rock salt structure, these give rise to a single diffraction reflection at ~2.4 Å, labeled as the (111) reflection. This is the largest symmetry allowed d-spacing in the rock salt structure. The second largest d-spacing allowed in the rock salt structure is the (200) peak whose d-spacing is ~2.1 Å. In lower symmetry structures such as $Li_{1/2}Ni_{1/2}O$ and $Li_{1/2}Ni_{1/3}Ta_{1/6}O$, reflections equivalent to the rock salt (111) and (200) reflections are observed at approximately the same d-spacing but are labeled differently and may be split into multiple peaks. For example, in the hexagonal, layered material the rock salt (111) reflection splits into two reflections, the (006) and the (102) peak, both of which occur at ~2.4 Å and the rock salt (200) peak becomes the (104) peak, whose d-spacing is also 2.1 Å. A clear signature that an ordered metal sub-lattice exists within a material giving rise to structures such as $Li_{1/2}Ni_{1/2}O$, $Li_{1/2}Ni_{1/3}Nb_{1/6}O$, and $Li_{1/4}Mn_{3/8}Ni_{1/8}O$ is the presence of reflections with d-spacings greater than 2.4 Å (Table 1).

TABLE 1

Largest d-spacing (Å) and associated hkl of example materials derived from metals within octahedral and/or tetrahedral sites created by close packed oxygen arrays

| Composition | Structure Note | Largest d-spacing (Å) | hkl |
|---|---|---|---|
| NiO | rock salt | 2.4 | (111) |
| $Li_{0.1}Ni_{0.9}O$ | rock salt, Li and Ni randomly arranged | 2.4 | (111) |
| $Li_{1/2}Ni_{1/2}O$ | Hexagonal, Li and Ni ordered into layers | 4.7 | (003) |
| $Li_{1/2}Ni_{1/3}Ta_{1/6}O$ | Orthorhombic, Ta and Li/Ni ordered | 4.7 | (111) |
| $Li_{1/4}Mn_{3/8}Ni_{1/8}O$ | Cubic, Ni/Mn in octahedral sites; Li in tetrahedral sites | 4.7 | (111) |

Although a range of electrochromic anodic materials have been proposed date, there is a need for anode films that can be prepared by simple single-step deposition processes to produce EC anodes with improved thermal stability, high optical clarity in their as-deposited states, and that can be tuned via composition and film thickness to adopt a wide variety of area charge capacities and optical switching properties.

SUMMARY OF THE INVENTION

Among the various aspects of the present invention is the provision of novel electrochromic lithium nickel oxide compositions and the provision of articles comprising such compositions.

Briefly, therefore, one aspect of the present invention is a multi-layer device comprising a layer of a lithium nickel oxide composition on a substrate. The lithium nickel oxide composition comprises lithium, nickel, and at least one Group 4 metal selected from the group consisting of titanium, zirconium and hafnium.

A further aspect of the present invention is a multi-layer device comprising a layer of a lithium nickel oxide composition on a first substrate wherein the lithium nickel oxide composition is characterized by a largest d-spacing of at least 2.5 Å and comprises lithium, nickel, and at least one Group 4 metal selected from the group consisting of titanium, zirconium and hafnium.

A further aspect of the present invention is a multi-layer device comprising a layer of a lithium nickel oxide composition on a first substrate wherein the lithium nickel oxide composition exhibits long range ordering by X-ray diffraction analysis and comprises lithium, nickel, and at least one of titanium, zirconium and hafnium.

A further aspect of the present invention is a multi-layer device comprising a layer of a lithium nickel oxide composition on a first substrate wherein the lithium nickel oxide composition exhibits long range ordering as measured by the presence of at least one reflection peak in the XRD pattern between 0 and 80 degrees (2θ) and comprises lithium, nickel, and at least one of titanium, zirconium and hafnium.

A further aspect of the present invention is a multi-layer device comprising a layer of a lithium nickel oxide composition on a first substrate wherein the lithium nickel oxide composition exhibits long range ordering as measured by the presence of at least one reflection peak in the XRD pattern below 26 degrees (2θ) and comprises lithium, nickel, and at least one of titanium, zirconium and hafnium.

A further aspect of the present invention is an electrochromic device comprising a layer of a lithium nickel oxide composition on a first substrate wherein the lithium nickel oxide composition comprises lithium, nickel, and at least one of titanium, zirconium and hafnium, and the atomic ratio of the amount of lithium to the combined amount of nickel, titanium, zirconium and hafnium in the lithium nickel oxide composition is less than 1.75:1, respectively, when the lithium nickel oxide composition is in its fully bleached state.

A further aspect of the present invention is an electrochromic device comprising a first substrate and a second substrate, a first and a second electrically conductive layer, a cathode layer, a layer comprising a lithium nickel oxide composition, and an ion conductor layer, wherein the first electrically conductive layer is between the first substrate and the lithium nickel oxide layer, the lithium nickel oxide layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer. The lithium nickel oxide composition comprises lithium, nickel, and at least one Group 4 metal selected from the group consisting of titanium, zirconium and hafnium wherein the atomic ratio of the amount of lithium to the combined amount of nickel, titanium, zirconium and hafnium in the lithium nickel oxide composition is less than 1.75:1, respectively, when the lithium nickel oxide composition is in its fully bleached state.

A further aspect of the present invention is an electrochromic device comprising a first substrate and a second substrate, a first and a second electrically conductive layer, a cathode layer, a layer comprising a lithium nickel oxide composition, and an ion conductor layer, wherein the first electrically conductive layer is between the first substrate and the lithium nickel oxide layer, the lithium nickel oxide layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer. The lithium nickel oxide composition comprises lithium, nickel, and at least one Group 4 metal selected from the group consisting of titanium, zirconium and hafnium wherein the lithium nickel oxide composition is characterized by a largest d-spacing of at least 2.5 Å.

A further aspect of the present invention is an electrochromic device comprising a layer of a lithium nickel oxide composition on a first substrate wherein the lithium nickel oxide composition exhibits long range ordering by X-ray diffraction analysis and comprises lithium, nickel, and at least one of titanium, zirconium and hafnium.

A further aspect of the present invention is an electrochromic device comprising a first substrate and a second substrate, a first and a second electrically conductive layer, a cathode layer, a layer comprising a lithium nickel oxide composition, and an ion conductor layer, wherein the first electrically conductive layer is between the first substrate and the lithium nickel oxide layer, the lithium nickel oxide layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer. The lithium nickel oxide composition comprises lithium, nickel, and at least one Group 4 metal selected from the group consisting of titanium, zirconium and hafnium.

A further aspect of the present invention is a process for forming a multi-layer device. The process comprises depositing a film of a liquid mixture onto a surface of a substrate and treating the deposited film to form a layer of an electrochromic lithium nickel oxide composition on the surface of the substrate wherein the liquid mixture comprises at least one Group 4 metal selected from the group consisting of titanium, zirconium and hafnium.

A further aspect of the present invention is a process for preparing an electrochromic device comprising a first and a second substrate, a first and a second electrically conductive layer, a cathode layer, a lithium nickel oxide anode layer and an ion conductor layer wherein the first electrically conductive layer is between the first substrate and the lithium nickel oxide anode layer, the lithium nickel oxide anode layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer. The process comprises depositing a liquid mixture comprising lithium, nickel and at least one Group 4 metal selected from the group consisting of titanium, zirconium and hafnium onto a surface to form a deposited film, and treating the deposited film to form the lithium nickel oxide anode layer.

Other objects and features will be in part apparent and in part pointed out hereinafter.

Figure 1:
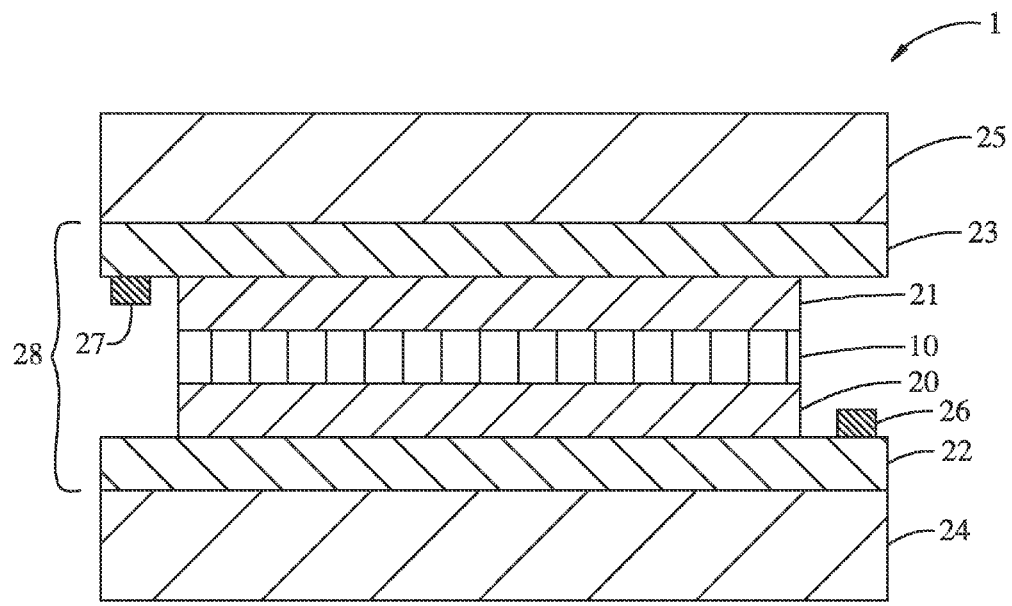
FIG. 1 is a schematic cross-section of a multi-layer electrochromic structure comprising an anodic electrochromic layer of the present invention.

Corresponding reference characters indicate corresponding parts throughout the drawings. Additionally, relative thicknesses of the layers in the different figures do not represent the true relationship in dimensions. For example, the substrates are typically much thicker than the other layers. The figures are drawn only for the purpose to illustrate connection principles, not to give any dimensional information.

ABBREVIATIONS AND DEFINITIONS

The following definitions and methods are provided to better define the present invention and to guide those of ordinary skill in the art in the practice of the present invention. Unless otherwise noted, terms are to be understood according to conventional usage by those of ordinary skill in the relevant art.

Unless otherwise indicated, the alkyl groups described herein are preferably lower alkyl containing from one to eight carbon atoms in the principal chain and up to 20 carbon atoms. They may be linear or branched chain or cyclic and include methyl, ethyl, propyl, isopropyl, butyl, hexyl, cyclohexyl and the like.

The terms "amine" or "amino," as used herein alone or as part of another group, represents a group of formula —N($R^8$)($R^9$), wherein $R^8$ and $R^9$ are independently hydrogen, hydrocarbyl, substituted hydrocarbyl, silyl, or $R^8$ and $R^9$ taken together form a substituted or unsubstituted cyclic or polycyclic moiety, each as defined in connection with such term, typically having from 3 to 8 atoms in the ring. "Substituted amine," for example, refers to a group of formula —N($R^8$)($R^9$), wherein at least one of $R^8$ and $R^9$ are other than hydrogen. "Unsubstituted amine," for example, refers to a group of formula —N($R^8$)($R^9$), wherein $R^8$ and $R^9$ are both hydrogen.

The term "alkoxide" as used herein refers to a deprotonated alcohol and is typically used to describe a metal complex of the form $M^1$-OR where $M^1$ is a metal.

There term "amide" as used herein in connection with a metal complex refers to a metal complex of the form $M^1$-N$(R^8)(R^9)$ where $M^1$ is a metal.

The terms "aryl" as used herein alone or as part of another group denote optionally substituted homocyclic aromatic groups, preferably monocyclic or bicyclic groups containing from 6 to 12 carbons in the ring portion, such as phenyl, biphenyl, naphthyl, substituted phenyl, substituted biphenyl or substituted naphthyl. Phenyl and substituted phenyl are the more preferred aryl.

The terms "anodic electrochromic layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state stabilizing element" as used herein means an element that acts to increase the bleached state voltage of lithium nickel oxide without adversely affecting the transmissivity of its fully bleached state, such as by decreasing the transmissivity of the fully bleached state or by resulting in a shift in the color coordinates of the fully bleached state, such as the creation of a yellow or brown hue to said fully bleached state. In general, bleached state stabilizing elements are those elements that readily form as colorless or lightly colored oxides solids in their highest oxidation state (i.e., formally d0), and where the highest oxidation state is 3+ or greater.

The term "bleached state voltage" refers to the open circuit voltage ($V^{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically and optically matched" (EOM) refers to a set of cathode and anode electrochromic films with similar charge capacities, that are in their complimentary optical states (e.g., both in their bleached state, or both in their darkened state or both in an intermediate state of coloration) such that when joined together by a suitable ion-conducting and electrically insulating layer, a functional electrochromic device is formed that shows reversible switching behavior and high switching currents The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The terms "halide," "halogen" or "halo" as used herein alone or as part of another group refer to chlorine, bromine, fluorine, and iodine.

The term "heteroatom" shall mean atoms other than carbon and hydrogen.

The terms "hydrocarbon" and "hydrocarbyl" as used herein describe organic compounds or radicals consisting exclusively of the elements carbon and hydrogen. These moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms.

The term "rock salt" as used herein describes a cubic structure in which metal cations ("M") occupy all of the octahedral sites of the cubic structure, resulting in the stoichiometry MO. Furthermore, the metals are indistinguishable from one another regardless of whether the metals are the same element or a random distribution of different elements.

The term "silyl" as used herein describes substituents of the general formula —Si$(X^8)(X^9)(X^{10})$ where $X^8$, $X^9$, and $X^{10}$ are independently hydrocarbyl or substituted hydrocarbyl.

The "substituted hydrocarbyl" moieties described herein are hydrocarbyl moieties which are substituted with at least one atom other than carbon, including moieties in which a carbon chain atom is substituted with a hetero atom such as nitrogen, oxygen, silicon, phosphorous, boron, sulfur, or a halogen atom. These substituents include halogen, heterocyclo, alkoxy, alkenoxy, alkynoxy, aryloxy, hydroxy, protected hydroxy, keto, acyl, acyloxy, nitro, amino, amido, nitro, cyano, thiol, ketals, acetals, esters, ethers, and thioethers.

The term "transmissivity" refers to the fraction of light transmitted through an electrochromic film. Unless otherwise stated, the transmissivity of an electrochromic film is represented by the number Tvis. Tvis is calculated/obtained by integrating the transmission spectrum in the wavelength range of 400-730 nm using the spectral photopic efficiency I_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

DETAILED DESCRIPTION OF THE PREFERRED EMBODIMENTS

In accordance with one aspect of the present invention, anodic electrochromic lithium nickel oxides comprising titanium, zirconium, hafnium or a combination thereof having a range of desirable properties and characteristics may be prepared. For example, in one embodiment the anodic electrochromic material may have a bleached state voltage value significantly greater than 2.0V. In another embodiment, the anodic electrochromic material is provided in an electrochemically and optically matched (EOM) state relative to a cathodic electrochromic material in its fully bleached state for use in an electrochromic device. In another embodiment, the anodic electrochromic material is relatively stable; for example, the lithium nickel oxide material does not darken from its fully bleached state or deactivate (e.g., remain transparent but no longer function as an electrochromic anode material or film) at elevated temperatures in the presence of ambient air.

Advantageously, titanium, zirconium and hafnium promote the formation of electrochromic lithium nickel oxide materials having favorable bleached state characteristics. In one embodiment, the electrochromic nickel oxide material comprises titanium. In another embodiment, the electrochromic nickel oxide material comprises zirconium. In another embodiment, the electrochromic nickel oxide material comprises hafnium. In another embodiment, the electrochromic nickel oxide material comprises titanium, zirconium and hafnium. In another embodiment, the electrochromic nickel oxide material comprises titanium, but not zirconium or hafnium. In another embodiment, the electrochromic nickel oxide material comprises zirconium, but not titanium or hafnium. In another embodiment, the electrochromic nickel oxide material comprises hafnium, but not titanium or zirconium.

In one embodiment, the lithium nickel oxide material is characterized by a largest d-spacing of at least 2.5 Å by diffraction techniques such as electron diffraction ("ED") and X-ray diffraction ("XRD") analysis. For example, in one embodiment the lithium nickel oxide material is characterized by a largest d-spacing of at least 2.75 Å. By way of further example, in one embodiment the lithium nickel oxide material is characterized by a largest d-spacing of at least 3 Å. By way of further example, in one embodiment the lithium nickel oxide material is characterized by a largest d-spacing of at least 3 Å. By way of further example, in one embodiment the lithium nickel oxide material is characterized by a largest d-spacing of at least 3.5 Å. By way of further example, in one embodiment the lithium nickel oxide material is characterized by a largest d-spacing of at least 4 Å. By way of further example, in one embodiment the lithium nickel oxide material is characterized by a largest d-spacing of at least 4.5 Å. By way of further example, in one embodiment the lithium nickel oxide material exhibits long range ordering as measured by the presence of at least one reflection peak in the XRD pattern between 0 and 80 degrees (2θ) when measured with copper Kα radiation. By way of further example, in one embodiment the lithium nickel oxide material exhibits long range ordering as measured by the presence of at least one reflection peak in the XRD pattern below 26 degrees (2θ) when measured with copper Kα radiation. In each of the foregoing examples, the lithium nickel oxide composition may comprise titanium, zirconium, hafnium or a combination thereof. In one such embodiment, the electrochromic nickel oxide material comprises titanium. In another such embodiment, the electrochromic nickel oxide material comprises zirconium. In another such embodiment, the electrochromic nickel oxide material comprises hafnium.

In accordance with one aspect of the present invention, the relative amounts of lithium, nickel, and titanium in the electrochromic lithium nickel oxide material are controlled such that an atomic ratio of the amount of lithium to the combined amount of nickel and titanium (i.e., Li: [Ni+Ti]) in the electrochromic lithium nickel oxide material is generally at least about 0.4:1. By way of further example, in one such embodiment the atomic ratio of lithium to the combined amount of nickel and titanium in the electrochromic lithium nickel oxide material is at least about 0.75:1, respectively. By way of further example, in one such embodiment the atomic ratio of lithium to the combined amount of nickel and titanium in the electrochromic lithium nickel oxide material is at least about 0.9:1, respectively. By way of further example, in one such embodiment the atomic ratio of lithium to the combined amount of nickel and titanium in the electrochromic lithium nickel oxide material is at least about 1:1, respectively. By way of further example, in one such embodiment the atomic ratio of lithium to the combined amount of nickel and titanium in the electrochromic lithium nickel oxide material is at least about 1.25:1, respectively. By way of further example, in one such embodiment the atomic ratio of lithium to the combined amount of nickel and titanium in the electrochromic lithium nickel oxide material is at least about 1.5:1, respectively. By way of further example, in one such embodiment the atomic ratio of lithium to the combined amount of nickel and titanium in the electrochromic lithium nickel oxide material is at least about 2:1, respectively. By way of further example, in one such embodiment the atomic ratio of lithium to the combined amount of nickel and titanium in the electrochromic lithium nickel oxide material is at least about 2.5:1, respectively. In certain embodiments, the atomic ratio of lithium to the combined amount of nickel and titanium in the electrochromic lithium nickel oxide material will not exceed about 4:1, respectively. In some embodiments, therefore, the atomic ratio of lithium to the combined amount of nickel and titanium in the electrochromic lithium nickel oxide material will be in the range about 0.75:1 to about 3:1, respectively. In some embodiments, therefore, the atomic ratio of lithium to the combined amount of nickel and titanium in the electrochromic lithium nickel oxide material will be in the range about 0.9:1 to about 2.5:1, respectively. In some embodiments, therefore, the atomic ratio of lithium to the combined amount of nickel and titanium in the electrochromic lithium nickel oxide material will be in the range about 1:1 to about 2.5:1, respectively. In some embodiments, therefore, the atomic ratio of lithium to the combined amount of nickel and titanium in the electrochromic lithium nickel oxide material will be in the range about 1.1:1 to about 1.5:1, respectively. In some embodiments, therefore, the atomic ratio of lithium to the combined amount of nickel and titanium in the electrochromic lithium nickel oxide material will be in the range about 1.5:1 to about 2:1, respectively. In some embodiments, therefore, the atomic ratio of lithium to the combined amount of nickel and titanium in the electrochromic lithium nickel oxide material will be in the range about 2:1 to about 2.5:1, respectively.

In accordance with one aspect of the present invention, the relative amounts of lithium, nickel, and titanium in the electrochromic lithium nickel oxide material are controlled such that an atomic ratio of the amount of lithium to the combined amount of nickel and titanium (i.e., Li: [Ni+Ti]) in the electrochromic lithium nickel oxide material is generally less than 1.75:1 when the electrochromic lithium nickel oxide material is in its fully bleached state. For example, in one such embodiment the atomic ratio of lithium to the combined amount of nickel and titanium in the electrochromic lithium nickel oxide material is less than 1.5:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.45:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.4:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.35:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.3:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.25:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.2:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.15:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.1:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1.05:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is less than 1:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of nickel and titanium in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of nickel and titanium in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of nickel and titanium in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of nickel and titanium in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of nickel and titanium in the electrochromic lithium nickel oxide material is in the range of about 0.9:1 to 1.35:1, respectively, when the electrochromic lithium nickel oxide material is in its fully bleached state.

In accordance with one aspect of the present invention, the relative amounts of lithium, nickel and zirconium in the electrochromic lithium nickel oxide material are controlled such that an atomic ratio of the amount of lithium to the combined amount of nickel and zirconium (i.e., Li: [Ni+Zr]) in the electrochromic lithium nickel oxide material is generally at least about 0.4:1. By way of further example, in one such embodiment the atomic ratio of lithium to the combined amount of nickel and zirconium in the electrochromic lithium nickel oxide material is at least about 0.75:1, respectively. By way of further example, in one such embodiment the atomic ratio of lithium to the combined amount of nickel and zirconium in the electrochromic lithium nickel oxide material is at least about 0.9:1, respectively. By way of further example, in one such embodiment the atomic ratio of lithium to the combined amount of nickel and zirconium in the electrochromic lithium nickel oxide material is at least about 1:1, respectively. By way of further example, in one such embodiment the atomic ratio of lithium to the combined amount of nickel and zirconium in the electrochromic lithium nickel oxide material is at least about 1.25:1, respectively. By way of further example, in one such embodiment the atomic ratio of lithium to the combined amount of nickel and zirconium in the electrochromic lithium nickel oxide material is at least about 1.5:1, respectively. By way of further example, in one such embodiment the atomic ratio of lithium to the combined amount of nickel and zirconium in the electrochromic lithium nickel oxide material is at least about 2:1, respectively. By way of further example, in one such embodiment the atomic ratio of lithium to the combined amount of nickel and zirconium in the electrochromic lithium nickel oxide material is at least about 2.5:1, respectively. In certain embodiments, the atomic ratio of lithium to the combined amount of nickel and zirconium in the electrochromic lithium nickel oxide material will not exceed about 4:1, respectively. In some embodiments, therefore, the atomic ratio of lithium to the combined amount of nickel and zirconium in the electrochromic lithium nickel oxide material will be in the range about 0.75:1 to about 3:1, respectively. In some embodiments, therefore, the atomic ratio of lithium to the combined amount of nickel and zirconium in the electrochromic lithium nickel oxide material will be in the range about 0.9:1 to about 2.5:1, respectively. In some embodiments, therefore, the atomic ratio of lithium to the combined amount of nickel and zirconium in the electrochromic lithium nickel oxide material will be in the range about 1:1 to about 2.5:1, respectively. In some embodiments, therefore, the atomic ratio of lithium to the combined amount of nickel and zirconium in the electrochromic lithium nickel oxide material will be in the range about 1.1:1 to about 1.5:1, respectively. In some embodiments, therefore, the atomic ratio of lithium to the combined amount of nickel and zirconium in the electrochromic lithium nickel oxide material will be in the range about 1.5:1 to about 2:1, respectively. In some embodiments, therefore, the atomic ratio of lithium to the combined amount of nickel and zirconium in the electrochromic lithium nickel oxide material will be in the range about 2:1 to about 2.5:1, respectively.

In accordance with one aspect of the present invention, the relative amounts of lithium, nickel and zirconium in the electrochromic lithium nickel oxide material are controlled such that an atomic ratio of the amount of lithium to the combined amount of nickel and zirconium (i.e., Li: [Ni+Zr]) in the electrochromic lithium nickel oxide material is generally less than about 1.75:1 when the electrochromic lithium nickel oxide material is in its fully bleached state. For example, in one such embodiment the atomic ratio of lithium to the combined amount of nickel and zirconium in the electrochromic lithium nickel oxide material is less than 1.5:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.45:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.4:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.35:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.3:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.25:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.2:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.15:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.1:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1.05:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is less than 1:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of nickel and zirconium in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of nickel and zirconium in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of nickel and zirconium in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of nickel and zirconium in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of nickel and zirconium in the electrochromic lithium nickel oxide material is in the range of about 0.9:1 to 1.35:1, respectively, when the electrochromic lithium nickel oxide material is in its fully bleached state.

In accordance with one aspect of the present invention, the relative amounts of lithium, nickel and hafnium in the electrochromic lithium nickel oxide material are controlled such that an atomic ratio of the amount of lithium to the combined amount of nickel and hafnium (i.e., Li: [Ni+Hf]) in the electrochromic lithium nickel oxide material is generally at least about 0.4:1. By way of further example, in one such embodiment the atomic ratio of lithium to the combined amount of nickel and hafnium in the electrochromic lithium nickel oxide material is at least about 0.75:1, respectively. By way of further example, in one such embodiment the atomic ratio of lithium to the combined amount of nickel and hafnium in the electrochromic lithium nickel oxide material is at least about 0.9:1, respectively. By way of further example, in one such embodiment the atomic ratio of lithium to the combined amount of nickel and hafnium in the electrochromic lithium nickel oxide material is at least about 1:1, respectively. By way of further example, in one such embodiment the atomic ratio of lithium to the combined amount of nickel and hafnium in the electrochromic lithium nickel oxide material is at least about 1.25:1, respectively. By way of further example, in one such embodiment the atomic ratio of lithium to the combined amount of nickel and hafnium in the electrochromic lithium nickel oxide material is at least about 1.5:1, respectively. By way of further example, in one such embodiment the atomic ratio of lithium to the combined amount of nickel and hafnium in the electrochromic lithium nickel oxide material is at least about 2:1, respectively. By way of further example, in one such embodiment the atomic ratio of lithium to the combined amount of nickel and hafnium in the electrochromic lithium nickel oxide material is at least about 2.5:1, respectively. In certain embodiments, the atomic ratio of lithium to the combined amount of nickel and hafnium in the electrochromic lithium nickel oxide material will not exceed about 4:1, respectively. In some embodiments, therefore, the atomic ratio of lithium to the combined amount of nickel and hafnium in the electrochromic lithium nickel oxide material will be in the range about 0.75:1 to about 3:1, respectively. In some embodiments, therefore, the atomic ratio of lithium to the combined amount of nickel and hafnium in the electrochromic lithium nickel oxide material will be in the range about 0.9:1 to about 2.5:1, respectively. In some embodiments, therefore, the atomic ratio of lithium to the combined amount of nickel and hafnium in the electrochromic lithium nickel oxide material will be in the range about 1:1 to about 2.5:1, respectively. In some embodiments, therefore, the atomic ratio of lithium to the combined amount of nickel and hafnium in the electrochromic lithium nickel oxide material will be in the range about 1.1:1 to about 1.5:1, respectively. In some embodiments, therefore, the atomic ratio of lithium to the combined amount of nickel and hafnium in the electrochromic lithium nickel oxide material will be in the range about 1.5:1 to about 2:1, respectively. In some embodiments, therefore, the atomic ratio of lithium to the combined amount of nickel and hafnium in the electrochromic lithium nickel oxide material will be in the range about 2:1 to about 2.5:1, respectively.

In accordance with one aspect of the present invention, the relative amounts of lithium, nickel and hafnium in the electrochromic lithium nickel oxide material are controlled such that an atomic ratio of the amount of lithium to the combined amount of nickel and hafnium (i.e., Li: [Ni+Hf]) in the electrochromic lithium nickel oxide material is generally less than about 1.75:1 when the electrochromic lithium nickel oxide material is in its fully bleached state. For example, in one such embodiment the atomic ratio of lithium to the combined amount of nickel and hafnium in the electrochromic lithium nickel oxide material is less than 1.5:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.45:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.4:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.35:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.3:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.25:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.2:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.15:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.1:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1.05:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is less than 1:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of nickel and hafnium in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of nickel and hafnium in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of nickel and hafnium in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of nickel and hafnium in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of nickel and hafnium in the electrochromic lithium nickel oxide material is in the range of about 0.9:1 to 1.35:1, respectively, when the electrochromic lithium nickel oxide material is in its fully bleached state.

In accordance with one aspect of the present invention, the relative amounts of lithium, nickel, titanium, zirconium and hafnium in the electrochromic lithium nickel oxide material are controlled such that an atomic ratio of the amount of lithium to the combined amount of nickel, titanium, zirconium and hafnium (i.e., Li: [Ni+Ti+Zr+Hf]) in the electrochromic lithium nickel oxide material is generally at least about 0.4:1. By way of further example, in one such embodiment the atomic ratio of lithium to the combined amount of nickel, titanium, zirconium and hafnium in the electrochromic lithium nickel oxide material is at least about 0.75:1, respectively. By way of further example, in one such embodiment the atomic ratio of lithium to the combined amount of nickel, titanium, zirconium and hafnium in the electrochromic lithium nickel oxide material is at least about 0.9:1, respectively. By way of further example, in one such embodiment the atomic ratio of lithium to the combined amount of nickel, titanium, zirconium and hafnium in the electrochromic lithium nickel oxide material is at least about 1:1, respectively. By way of further example, in one such embodiment the atomic ratio of lithium to the combined amount of nickel, titanium, zirconium and hafnium in the electrochromic lithium nickel oxide material is at least about 1.25:1, respectively. By way of further example, in one such embodiment the atomic ratio of lithium to the combined amount of nickel, titanium, zirconium and hafnium in the electrochromic lithium nickel oxide material is at least about 1.5:1, respectively. By way of further example, in one such embodiment the atomic ratio of lithium to the combined amount of nickel, titanium, zirconium and hafnium in the electrochromic lithium nickel oxide material is at least about 2:1, respectively. By way of further example, in one such embodiment the atomic ratio of lithium to the combined amount of nickel, titanium, zirconium and hafnium in the electrochromic lithium nickel oxide material is at least about 2.5:1, respectively. In certain embodiments, the atomic ratio of lithium to the combined amount of nickel, titanium, zirconium and hafnium in the electrochromic lithium nickel oxide material will not exceed about 4:1, respectively. In some embodiments, therefore, the atomic ratio of lithium to the combined amount of nickel, titanium, zirconium and hafnium in the electrochromic lithium nickel oxide material will be in the range about 0.75:1 to about 3:1, respectively. In some embodiments, therefore, the atomic ratio of lithium to the combined amount of nickel, titanium, zirconium and hafnium in the electrochromic lithium nickel oxide material will be in the range about 0.9:1 to about 2.5:1, respectively. In some embodiments, therefore, the atomic ratio of lithium to the combined amount of nickel, titanium, zirconium and hafnium in the electrochromic lithium nickel oxide material will be in the range about 1:1 to about 2.5:1, respectively. In some embodiments, therefore, the atomic ratio of lithium to the combined amount of nickel, titanium, zirconium and hafnium in the electrochromic lithium nickel oxide material will be in the range about 1.1:1 to about 1.5:1, respectively. In some embodiments, therefore, the atomic ratio of lithium to the combined amount of nickel, titanium, zirconium and hafnium in the electrochromic lithium nickel oxide material will be in the range about 1.5:1 to about 2:1, respectively. In some embodiments, therefore, the atomic ratio of lithium to the combined amount of nickel, titanium, zirconium and hafnium in the electrochromic lithium nickel oxide material will be in the range about 2:1 to about 2.5:1, respectively.

In accordance with one aspect of the present invention, the relative amounts of lithium, nickel, titanium, zirconium and hafnium in the electrochromic lithium nickel oxide material are controlled such that an atomic ratio of the amount of lithium to the combined amount of nickel, titanium, zirconium and hafnium (i.e., Li: [Ni+Ti+Zr+Hf]) in the electrochromic lithium nickel oxide material is generally less than 1.75:1 when the electrochromic lithium nickel oxide material is in its fully bleached state. For example, in one such embodiment the atomic ratio of lithium to the combined amount of nickel, titanium, zirconium and hafnium in the electrochromic lithium nickel oxide material is less than 1.5:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.45:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.4:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.35:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.3:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.25:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.2:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.15:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.1:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1.05:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is less than 1:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of nickel, titanium, zirconium and hafnium in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of nickel, titanium, zirconium and hafnium in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of nickel, titanium, zirconium and hafnium in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of nickel, titanium, zirconium and hafnium in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of nickel, titanium, zirconium and hafnium in the electrochromic lithium nickel oxide material is in the range of about 0.9:1 to 1.35:1, respectively, when the electrochromic lithium nickel oxide material is in its fully bleached state.

In general, increasing the amount of titanium, zirconium and/or hafnium relative to the amount of nickel in the electrochromic lithium nickel oxide material increases the stability of the bleached state and the bleached state voltage of the material but it also tends to decrease its volumetric charge capacity. Anodic electrochromic lithium nickel oxide material having large amounts of titanium, zirconium and/or hafnium relative to nickel, such as those in which the atomic ratio of the combined amount of titanium, zirconium and hafnium to the combined amount of nickel, titanium, zirconium and hafnium (i.e., [Ti+Zr+Hf]:[Ni+Ti+Zr+Hf]) is greater than about 0.8:1, respectively, tend to have stable fully bleached states, but sub-optimal charge capacities and darkened state transmissivities. Thus, in certain embodiments it is preferred that the atomic ratio of the combined amount of titanium, zirconium and hafnium to the combined amount of nickel, titanium, zirconium and hafnium in the electrochromic lithium nickel oxide material be less than about 0.8:1 (i.e., [Ti+Zr+Hf]:[Ni+Ti+Zr+Hf]). For example, in one such embodiment the atomic ratio of the combined amount of titanium, zirconium and hafnium to the combined amount of nickel, titanium, zirconium and hafnium in the electrochromic lithium nickel oxide material is less than about 0.7:1 (i.e., [Ti+Zr+Hf]:[Ni+Ti+Zr+Hf]). By way of further example, in one such embodiment the atomic ratio of the combined amount of titanium, zirconium and hafnium to the combined amount of nickel, titanium, zirconium and hafnium in the electrochromic lithium nickel oxide material is less than about 0.6:1. By way of further example, in one such embodiment the atomic ratio of the combined amount of titanium, zirconium and hafnium to the combined amount of nickel, titanium, zirconium and hafnium in the electrochromic lithium nickel oxide material is less than about 0.5:1. By way of further example, in one such embodiment the atomic ratio of the combined amount of titanium, zirconium and hafnium to the combined amount of nickel, titanium, zirconium and hafnium in the electrochromic lithium nickel oxide material is less than about 0.4:1.

Conversely, anodic electrochromic lithium nickel oxide materials having small amounts of titanium, zirconium and/or hafnium relative to nickel, such as those in which the atomic ratio of the combined amount of titanium, zirconium and hafnium to the combined amount of nickel, titanium, zirconium and hafnium (i.e., [Ti+Zr+Hf]:[Ni+Ti+Zr+Hf])) is less than about 0.025:1, respectively, tend to have relatively high charge capacities but less stable fully bleached states. Thus, in certain embodiments it is preferred that the ratio (atomic) of the combined amount of titanium, zirconium and hafnium to the combined amount of nickel, titanium, zirconium and hafnium in the electrochromic lithium nickel oxide material be greater than about 0.03:1 (i.e., [Ti+Zr+Hf]:[Ni+Ti+Zr+Hf]). For example, in one such embodiment the atomic ratio of the combined amount of titanium, zirconium and hafnium to the combined amount of nickel, titanium, zirconium and hafnium in the electrochromic lithium nickel oxide material is greater than about 0.04:1 (i.e., [Ti+Zr+Hf]:[Ni+Ti+Zr+Hf]). By way of further example, in one such embodiment the atomic ratio of the combined amount of titanium, zirconium and hafnium to the combined amount of nickel, titanium, zirconium and hafnium in the electrochromic lithium nickel oxide material is greater than about 0.05:1. By way of further example, in one such embodiment the atomic ratio of the combined amount of titanium, zirconium and hafnium to the combined amount of nickel, titanium, zirconium and hafnium in the electrochromic lithium nickel oxide material is greater than about 0.075:1. By way of further example, in one such embodiment the atomic ratio of the combined amount of titanium, zirconium and hafnium to the combined amount of nickel, titanium, zirconium and hafnium in the electrochromic lithium nickel oxide material is greater than about 0.1:1. In each of the foregoing examples and embodiments recited in this paragraph, the lithium nickel oxide composition may comprise titanium but not zirconium or hafnium, zirconium but not titanium or hafnium, hafnium but not nickel or zirconium, any two of titanium, zirconium and hafnium but not the other of titanium, zirconium and hafnium, or all three of titanium, zirconium and hafnium.

In certain embodiments, the ratio (atomic) of titanium to the combined amount nickel and titanium in the anodic electrochromic lithium nickel oxide material will be in the range of about 0.025:1 to about 0.8:1 (Ti:[Ni+Ti]). For example, in one such embodiment the atomic ratio of titanium to the combined amount nickel and titanium in the anodic electrochromic lithium nickel oxide material will be in the range of about 0.05:1 and about 0.7:1 (Ti:[Ni+Ti]). By way of further example, in one such embodiment the atomic ratio of titanium to the combined amount nickel and titanium in the anodic electrochromic lithium nickel oxide material will be in the range of about 0.075:1 and about 0.6:1 (Ti:[Ni+Ti]). By way of further example, in one such embodiment the atomic ratio of titanium to the combined amount nickel and titanium in the anodic electrochromic lithium nickel oxide material will be in the range of about 0.1:1 and about 0.55:1 (Ti:[Ni+Ti]). By way of further example, in one such embodiment the atomic ratio of titanium to the combined amount nickel and titanium in the anodic electrochromic lithium nickel oxide material will be in the range of about 0.15:1 and about 0.5:1 (Ti:[Ni+Ti]). By way of further example, in one such embodiment the atomic ratio of titanium to the combined amount nickel and titanium in the anodic electrochromic lithium nickel oxide material will be in the range of about 0.175:1 and about 0.45:1 (Ti:[Ni+Ti]). By way of further example, in one such embodiment the atomic ratio of titanium to the combined amount nickel and titanium in the anodic electrochromic lithium nickel oxide material will be in the range of about 0.2:1 and about 0.4:1 (Ti:[Ni+Ti]).

In certain embodiments, the ratio (atomic) of zirconium to the combined amount nickel and zirconium in the anodic electrochromic lithium nickel oxide material will be in the range of about 0.025:1 to about 0.8:1 (Zr:[Ni+Zr]). For example, in one such embodiment the atomic ratio of zirconium to the combined amount nickel and zirconium in the anodic electrochromic lithium nickel oxide material will be in the range of about 0.05:1 and about 0.7:1 (Zr:[Ni+Zr]). By way of further example, in one such embodiment the atomic ratio of zirconium to the combined amount nickel and zirconium in the anodic electrochromic lithium nickel oxide material will be in the range of about 0.075:1 and about 0.6:1 (Zr:[Ni+Zr]). By way of further example, in one such embodiment the atomic ratio of zirconium to the combined amount nickel and zirconium in the anodic electrochromic lithium nickel oxide material will be in the range of about 0.1:1 and about 0.55:1 (Zr:[Ni+Zr]). By way of further example, in one such embodiment the atomic ratio of zirconium to the combined amount nickel and zirconium in the anodic electrochromic lithium nickel oxide material will be in the range of about 0.15:1 and about 0.5:1 (Zr:[Ni+Zr]). By way of further example, in one such embodiment the atomic ratio of zirconium to the combined amount nickel and zirconium in the anodic electrochromic lithium nickel oxide material will be in the range of about 0.175:1 and about 0.45:1 (Zr:[Ni+Zr]). By way of further example, in one such embodiment the atomic ratio of zirconium to the combined amount nickel and zirconium in the anodic electrochromic lithium nickel oxide material will be in the range of about 0.2:1 and about 0.4:1 (Zr:[Ni+Zr]).

In certain embodiments, the ratio (atomic) of hafnium to the combined amount nickel and hafnium in the anodic electrochromic lithium nickel oxide material will be in the range of about 0.025:1 to about 0.8:1 (Hf:[Ni+Hf]). For example, in one such embodiment the atomic ratio of hafnium to the combined amount nickel and hafnium in the anodic electrochromic lithium nickel oxide material will be in the range of about 0.05:1 and about 0.7:1 (Hf:[Ni+Hf]). By way of further example, in one such embodiment the atomic ratio of hafnium to the combined amount nickel and hafnium in the anodic electrochromic lithium nickel oxide material will be in the range of about 0.075:1 and about 0.6:1 (Hf:[Ni+Hf]). By way of further example, in one such embodiment the atomic ratio of hafnium to the combined amount nickel and hafnium in the anodic electrochromic lithium nickel oxide material will be in the range of about 0.1:1 and about 0.55:1 (Hf:[Ni+Hf]). By way of further example, in one such embodiment the atomic ratio of hafnium to the combined amount nickel and hafnium in the anodic electrochromic lithium nickel oxide material will be in the range of about 0.15:1 and about 0.5:1 (Hf:[Ni+Hf]). By way of further example, in one such embodiment the atomic ratio of hafnium to the combined amount nickel and hafnium in the anodic electrochromic lithium nickel oxide material will be in the range of about 0.175:1 and about 0.45:1 (Hf:[Ni+Hf]). By way of further example, in one such embodiment the atomic ratio of hafnium to the combined amount nickel and hafnium in the anodic electrochromic lithium nickel oxide material will be in the range of about 0.2:1 and about 0.4:1 (Hf:[Ni+Hf]).

In general, the ratio (atomic) of the combined amount of titanium, zirconium and hafnium to the combined amount nickel, titanium, zirconium and hafnium in the anodic electrochromic lithium nickel oxide material will typically be in the range of about 0.025:1 to about 0.8:1 ([Ti+Zr+Hf]:[Ni+Ti+Zr+Hf]). For example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.05:1 and about 0.7:1 ([Ti+Zr+Hf]:[Ni+Ti+Zr+Hf]). By way of further example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.075:1 and about 0.6:1 ([Ti+Zr+Hf]:[Ni+Ti+Zr+Hf]). By way of further example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.1:1 and about 0.55:1 ([Ti+Zr+Hf]:[Ni+Ti+Zr+Hf]). By way of further example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.15:1 and about 0.5:1 ([Ti+Zr+Hf]:[Ni+Ti+Zr+Hf]). By way of further example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.175:1 and about 0.45:1 ([Ti+Zr+Hf]:[Ni+Ti+Zr+Hf]). By way of further example, in one such embodiment the atomic ratio of the combined amount of titanium, zirconium and hafnium to the combined amount nickel, titanium, zirconium and hafnium in the anodic electrochromic lithium nickel oxide material will typically be in the range of about 0.2:1 and about 0.4:1 ([Ti+Zr+Hf]:[Ni+Ti+Zr+Hf]).

In one embodiment, the electrochromic nickel oxide material comprises one or more bleached state stabilizing elements selected from the group consisting of Group 3, Group 5, Group 6, Group 13, Group 14 and Group 15 elements (IUPAC classification), and combinations thereof in addition to titanium, zirconium and hafnium. In such embodiments, the relative amounts of lithium, nickel, titanium, zirconium, hafnium and the bleached state stabilizing element(s) in the electrochromic lithium nickel oxide material are controlled such that an atomic ratio of the amount of lithium to the combined amount of nickel, titanium, zirconium, hafnium and bleached state stabilizing element(s) in the electrochromic lithium nickel oxide material is generally at least about 0.4:1, respectively, wherein the bleached state stabilizing element(s) is/are selected from the group consisting of Group 3, Group 5, Group 6, Group 13, Group 14 and Group 15 elements, and combinations thereof. For example, in one embodiment, the atomic ratio of lithium to the combined amount of nickel and all Group 4 metal(s) and bleached state stabilizing elements, i.e., Li:[Ni+Ti+Zr+Hf+M], in the electrochromic lithium nickel oxide material is at least about 0.4:1, respectively, wherein M is a bleached state stabilizing element selected from the group consisting of Y, V, Nb, Ta, Mo, W, B, Al, Ga, In, Si, Ge, Sn, P, Sb, and combinations thereof; stated differently, the ratio of the amount of lithium to the combined amount of Ni, Y, Ti, Zr, Hf, V, Nb, Ta, Mo, W, B, Al, Ga, In, Si, Ge, Sn, P, and Sb, in the electrochromic nickel oxide material is at least 0.4:1 (atomic ratio), respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 0.75:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 0.9:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 1:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 1.25:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 1.5:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 2:1, respectively. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb is at least about 2.5:1, respectively. In certain embodiments, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will not exceed about 4:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 0.75:1 to about 3:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 0.9:1 to about 2.5:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 1:1 to about 2.5:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 1.1:1 to about 1.5:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 1.5:1 to about 2:1, respectively. In some embodiments, therefore, the atomic ratio of lithium to the combined amount of nickel, titanium, zirconium, hafnium and the bleached state stabilizing element(s) M in the electrochromic lithium nickel oxide material (e.g., wherein M is Y, V, Nb, Ta, Mo, W, B, Al, Ga, In, Si, Ge, Sn, P, Sb or a combination thereof) will be in the range about 2:1 to about 2.5:1, respectively.

In one embodiment, the electrochromic nickel oxide material comprises one or more bleached state stabilizing elements selected from the group consisting of Group 3, Group 5, Group 6, Group 13, Group 14 and Group 15 elements (IUPAC classification), and combinations thereof in addition to titanium, zirconium and hafnium. In such embodiments, the relative amounts of lithium, nickel, titanium, zirconium, hafnium and the bleached state stabilizing element(s) in the electrochromic lithium nickel oxide material are controlled such that an atomic ratio of the amount of lithium to the combined amount of nickel, titanium, zirconium, hafnium and bleached state stabilizing element(s) in the electrochromic lithium nickel oxide material is generally less than about 1.75:1, respectively, wherein the bleached state stabilizing element(s) is/are selected from the group consisting of Group 3, Group 5, Group 6, Group 13, Group 14 and Group 15 elements, and combinations thereof, and the electrochromic nickel oxide material is in its fully bleached state. For example, in one embodiment, the atomic ratio of lithium to the combined amount of nickel and all Group 4 metal(s) and bleached state stabilizing elements, i.e., Li:[Ni+Ti+Zr+Hf+M], in the electrochromic lithium nickel oxide material is less than about 1.75:1, respectively, wherein M is a bleached state stabilizing element selected from the group consisting of Y, V, Nb, Ta, Mo, W, B, Al, Ga, In, Si, Ge, Sn, P, Sb, and combinations thereof and the electrochromic nickel oxide material is in its fully bleached state; stated differently, the ratio of the amount of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.75:1 (atomic ratio), respectively, when the electrochromic lithium nickel oxide material is in its fully bleached state. For example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.5:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.45:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.4:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.35:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.3:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.25:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.2:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.15:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.1:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1.05:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is less than 1:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.4:1 to 1.5:1, respectively, when the electrochromic lithium nickel oxide material is in its fully bleached state. By way of further example, in one such embodiment the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.5:1 to 1.4:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.6:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.7:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.8:1 to 1.35:1, respectively, when the electrochromic lithium nickel oxide material is in its fully bleached state. In certain embodiments, the atomic ratio of lithium to the combined amount of Ni, Y, Ti, Zr, Hf, V, Nb, Ta, Mo, W, B, Al, Ga, In, Si, Ge, Sn, P, and Sb, in the electrochromic lithium nickel oxide material is in the range of about 0.9:1 to 1.35:1, respectively, when the electrochromic lithium nickel oxide material is in its fully bleached state.

In those embodiments in which the electrochromic nickel oxide material comprises one or more bleached state stabilizing elements selected from the group consisting of Group 3, Group 5, Group 6, Group 13, Group 14 and Group 15 elements and combinations thereof in addition to titanium, zirconium and/or hafnium, increasing the amount of the Group 4 metal(s) and bleached state stabilizing element(s) relative to the amount of nickel in the electrochromic lithium nickel oxide material increases the stability and bleached state voltage of the material but it also tends to decrease its volumetric charge capacity. Anodic electrochromic lithium nickel oxide material having large amounts of titanium, zirconium, hafnium and bleached state stabilizing element(s) relative to nickel, such as those in which the atomic ratio of the combined amount of titanium, zirconium, hafnium and bleached state stabilizing element(s) M to the combined amount of nickel, titanium, zirconium, hafnium and bleached state stabilizing elements M (i.e., [Ti+Zr+Hf+M]:[Ni+Ti+Zr+Hf+M]) is greater than about 0.8:1, respectively, tend to have stable fully bleached states, but sub-optimal charge capacities and darkened state transmissivities. Thus, in certain embodiments it is preferred that the atomic ratio of the combined amount of titanium, zirconium, hafnium and bleached state stabilizing element(s) M to the combined amount of nickel, titanium, zirconium, hafnium and bleached state stabilizing elements M in the electrochromic lithium nickel oxide material be less than about 0.8:1 (i.e., [Ti+Zr+Hf+M]:[Ni+Ti+Zr+Hf+M]), respectively. For example, in one such embodiment the atomic ratio of the combined amount of titanium, zirconium, hafnium and bleached state stabilizing elements M to the combined amount of nickel, titanium, zirconium, hafnium and bleached state stabilizing elements M in the electrochromic lithium nickel oxide material is less than about 0.7:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing element(s) M in the electrochromic lithium nickel oxide material is less than about 0.6:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing element(s) M in the electrochromic lithium nickel oxide material is less than about 0.5:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing element(s) M in the electrochromic lithium nickel oxide material is less than about 0.4:1 (i.e., [Ti+Zr+Hf+M]:[Ni+Ti+Zr+Hf+M]), respectively.

Conversely, anodic electrochromic lithium nickel oxide materials having small amounts of titanium, zirconium, hafnium and bleached state stabilizing element(s) M relative to nickel, such as those in which the atomic ratio of the combined amount of titanium, zirconium, hafnium and bleached state stabilizing elements M (wherein M is Y, V, Nb, Ta, Mo, W, B, Al, Ga, In, Si, Ge, Sn, P, Sb or a combination thereof) to the combined amount of nickel, titanium, zirconium, hafnium and bleached state stabilizing elements M (i.e., [Ti+Zr+Hf+M]:[Ni+Ti+Zr+Hf+M]) is less than about 0.025:1, respectively, tend to have relatively high charge capacities but less stable fully bleached states. Thus, in certain embodiments it is preferred that the ratio (atomic) of the combined amount of titanium, zirconium, hafnium and bleached state stabilizing element(s) M to the combined amount of nickel, titanium, zirconium, hafnium and bleached state stabilizing elements M in the electrochromic lithium nickel oxide material be greater than about 0.03:1 (i.e., [Ti+Zr+Hf+M]:[Ni+Ti+Zr+Hf+M]), respectively. For example, in one such embodiment the atomic ratio of the combined amount of titanium, zirconium and hafnium to the combined amount of nickel, titanium, zirconium, hafnium and bleached state stabilizing elements M in the electrochromic lithium nickel oxide material is greater than about 0.04:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing elements M in the electrochromic lithium nickel oxide material is greater than about 0.05:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing elements M in the electrochromic lithium nickel oxide material is greater than about 0.075:1 (i.e., [Ti+Zr+Hf+M]:[Ni+Ti+Zr+Hf+M]), respectively. By way of further example, in one such embodiment the atomic ratio of the combined amount of titanium, zirconium, hafnium and bleached state stabilizing element(s) M to the combined amount of nickel, titanium, zirconium, hafnium and bleached state stabilizing elements M in the electrochromic lithium nickel oxide material is greater than about 0.1:1 (i.e., [Ti+Zr+Hf+M]:[Ni+Ti+Zr+Hf+M]), respectively.

In those embodiments in which the electrochromic nickel oxide material comprises one or more bleached state stabilizing elements selected from the group consisting of Group 3, Group 5, Group 6, Group 13, Group 14 and Group 15 elements and combinations thereof in addition to titanium, zirconium and/or hafnium, the ratio (atomic) of the combined amount of titanium, zirconium, hafnium and bleached state stabilizing elements to the combined amount nickel, titanium, zirconium, hafnium and bleached state stabilizing elements M (wherein M is Y, V, Nb, Ta, Mo, W, B, Al, Ga, In, Si, Ge, Sn, P, Sb or a combination thereof) in the anodic electrochromic lithium nickel oxide material will typically be in the range of about 0.025:1 to about 0.8:1 ([Ti+Zr+Hf+M]:[Ni+Ti+Zr+Hf+M]), respectively. For example, in one such embodiment the atomic ratio of the combined amount of titanium, zirconium, hafnium and bleached state stabilizing element(s) M to the combined amount nickel, titanium, zirconium, hafnium and bleached state stabilizing elements M in the anodic electrochromic lithium nickel oxide material will typically be in the range of about 0.05:1 and about 0.7:1 ([Ti+Zr+Hf+M]:[Ni+Ti+Zr+Hf+M]), respectively. By way of further example, in one such embodiment the atomic ratio of the combined amount of titanium, zirconium and hafnium and to the combined amount nickel, titanium, zirconium, hafnium and bleached state stabilizing elements M in the anodic electrochromic lithium nickel oxide material will typically be in the range of about 0.075:1 and about 0.6:1 ([Ti+Zr+Hf+M]:[Ni+Ti+Zr+Hf+M]), respectively.

In one embodiment, the anodic electrochromic lithium nickel oxide material has a bleached state voltage that is at least 2V. For example, in one embodiment the anodic electrochromic lithium oxide material has a bleached state voltage of at least 2.5V. By way of further example, in one embodiment the anodic electrochromic lithium oxide material has a bleached state voltage of at least 3V. By way of further example, in one embodiment the anodic electrochromic lithium oxide material has a bleached state voltage of at least 3.5V.

Electrochromic Stacks and Devices

FIG. 1 depicts a cross-sectional structural diagram of electrochromic device 1 having an electrochromic layer comprising lithium, nickel, and at least one bleached state stabilizing element in accordance with one embodiment of the present invention. Moving outward from the center, electrochromic device 1 comprises an ion conductor layer 10. Anode layer 20 is on one side of and in contact with a first surface of ion conductor layer 10. Cathode layer 21 is on the other side of and in contact with a second surface of ion conductor layer 10. The central structure, that is, layers 20, 10, 21, is positioned between first and second electrically conductive layers 22 and 23 which, in turn, are arranged against outer substrates 24, 25. Elements 22, 20, 10, 21, and 23 are collectively referred to as an electrochromic stack 28.

Ion conductor layer 10 serves as a medium through which lithium ions are transported (in the manner of an electrolyte) when the electrochromic device transforms between the bleached state and the darkened state. Ion conductor layer 10 comprises an ion conductor material and may be transparent or non-transparent, colored or non-colored, depending on the application. Preferably, ion conductor layer 10 is highly conductive to lithium ions and has sufficiently low electron conductivity that negligible electron transfer takes place during normal operation.

Some non-exclusive examples of electrolyte types are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI (lithium bis(trifluoromethane) sulfonimide), $LiBF_4$ (lithium tetrafluoroborate), $LiPF_6$ (lithium hexafluorophosphate), $LiAsF_6$ (lithium hexafluoro arsenate), $LiCF_3SO_3$ (lithium trifluoromethane sulfonate), $LiB(C_6F_5)_4$ (lithium perfluorotetraphenylboron) and $LiClO_4$ (lithium perchlorate). Additional examples of suitable ion conductor layers include silicates, tungsten oxides, tantalum oxides, niobium oxides, and borates. The silicon oxides include silicon-aluminum-oxide. These materials may be doped with different dopants, including lithium. Lithium doped silicon oxides include lithium silicon-aluminum-oxide. In some embodiments, the ion conductor layer comprises a silicate-based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

The thickness of the ion conductor layer 10 will vary depending on the material. In some embodiments using an inorganic ion conductor the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

Anode layer 20 is an electrochromic layer comprising lithium, nickel, and at least one Group 4 metal selected from titanium, zirconium and hafnium as described in greater detail elsewhere herein. In one embodiment, cathode layer 21 is an electrochromic layer. For example, cathode layer 21 may comprise an electrochromic oxide based on tungsten, molybdenum, niobium, titanium, and/or bismuth. In an alternative embodiment, cathode layer 21 is a non-electrochromic counter-electrode for anode layer 20 such as cerium-oxide.

The thickness of anode layer 20 and cathode layer 21 will depend upon the electrochromic material selected for the electrochromic layer and the application. In some embodiments, anode layer 20 will have a thickness in the range of about 25 nm to about 2000 nm. For example, in one embodiment anode layer 20 has a thickness of about 50 nm to about 2000 nm. By way of further example, in one embodiment anode layer 20 has a thickness of about 25 nm to about 1000 nm. By way of further example, in one such embodiment, anode layer 20 has an average thickness between about 100 nm and about 700 nm. In some embodiments, anode layer 20 has a thickness of about 250 nm to about 500 nm. Cathode layer 21 will typically have thicknesses in the same ranges as those stated for anode layer 20.

In one embodiment, anode layer 20 and cathode layer 21 are in electrochemically and optically matched (EOM) states. For example, when the cathode is a W-oxide film having a thickness of about 400 nm and an area charge capacity of 27 mC/cm$^2$, a lithium tungsten nickel oxide film having a thickness of about 250 nm and the a charge capacity of 27 mC/cm$^2$ over a cell voltage of about 1.7V (where 0V is the fully bleached state of both anode and cathode).

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 10 may be changed by applying a voltage pulse to electrically conductive layers 22 and 23. The pulse causes electrons and ions to move between electrochromic lithium nickel oxide layer 20 and cathode layer 21 and, as a result, the electrochromic lithium nickel oxide layer 20 and, optionally, cathode layer 21 change (s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

Referring again to FIG. 1, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

In one preferred embodiment of the invention, first substrate 24 and second substrate 25 are each float glass. In certain embodiments for architectural applications, this glass is at least 0.5 meters by 0.5 meters, and can be much larger, e.g., as large as about 3 meters by 4 meters. In such applications, this glass is typically at least about 2 mm thick and more commonly 4-6 mm thick.

Independent of application, the electrochromic devices of the present invention may have a wide range of sizes. In general, it is preferred that the electrochromic device comprise a substrate having a surface with a surface area of at least 0.001 meter$^2$. For example, in certain embodiments, the electrochromic device comprises a substrate having a surface with a surface area of at least 0.01 meter$^2$. By way of further example, in certain embodiments, the electrochromic device comprises a substrate having a surface with a surface area of at least 0.1 meter$^2$. By way of further example, in certain embodiments, the electrochromic device comprises a substrate having a surface with a surface area of at least 1 meter$^2$. By way of further example, in certain embodiments, the electrochromic device comprises a substrate having a surface with a surface area of at least 5 meter$^2$. By way of further example, in certain embodiments, the electrochromic device comprises a substrate having a surface with a surface area of at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nano particles (e.g., rods, tubes, dots) conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 μm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 1, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8Ω/□.

To facilitate more rapid switching of electrochromic device 1 from a state of relatively greater transmittance to a state of relatively lesser transmittance, or vice versa, at least one of electrically conductive layers 22, 23 may have a sheet resistance, $R_s$, to the flow of electrons through the layer that is non-uniform. For example, in one embodiment only one of first and second electrically conductive layers 22, 23 has a non-uniform sheet resistance to the flow of electrons through the layer. Alternatively, first electrically conductive layer 22 and second electrically conductive layer 23 may each have a non-uniform sheet resistance to the flow of electrons through the respective layers. Without being bound by any particular theory, it is presently believed that spatially varying the sheet resistance of electrically conductive layer 22, spatially varying the sheet resistance of electrically conductive layer 23, or spatially varying the sheet resistance of electrically conductive layer 22 and electrically conductive layer 23 improves the switching performance of the device by controlling the voltage drop in the conductive layer to provide uniform potential drop or a desired non-uniform potential drop across the device, over the area of the device as more fully described in WO2012/109494.

Figure 2:
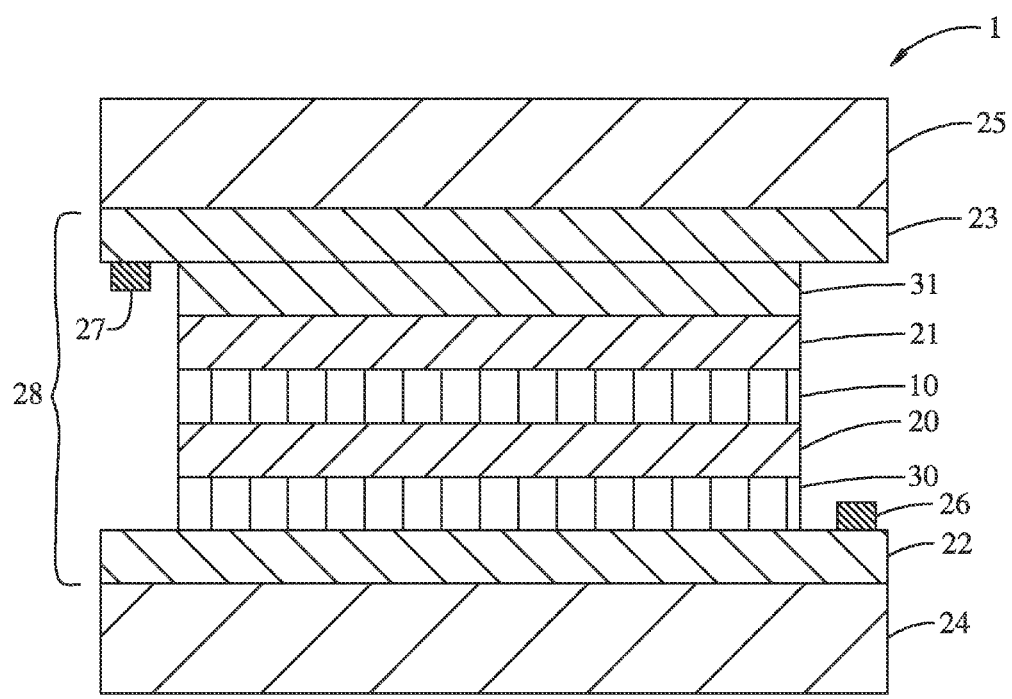
FIG. 2 is a schematic cross-section of an alternative embodiment of a multi-layer electrochromic structure comprising an anodic electrochromic layer of the present invention.

FIG. 2 depicts a cross-sectional structural diagram of electrochromic device 1 according to an alternative embodiment of the present invention. Moving outward from the center, electrochromic device 1 comprises an ion conductor layer 10. Anode electrode layer 20 (an electrochromic layer comprising lithium, nickel, and at least one Group 5 metal as described in greater detail elsewhere herein) is on one side of and in contact with a first surface of ion conductor layer 10, and cathode layer 21 is on the other side of and in contact with a second surface of ion conductor layer 10. First and second current modulating structures 30 and 31, in turn, are adjacent first and second electrically conductive layers 22 and 23, respectively, which are arranged against outer substrates 24, 25, respectively.

To facilitate more rapid switching of electrochromic device 1 from a state of relatively greater transmittance to a state of relatively lesser transmittance, or vice versa, first current modulating structure 30, second current modulating structure 31 or both first and second current modulating structures 30 and 31 comprise a resistive material (e.g., a material having a resistivity of at least about $10^4$ Ω·cm). In one embodiment at least one of first and second current modulating structures 30, 31 has a non-uniform cross-layer resistance, $R_C$, to the flow of electrons through the structure. In one such embodiment only one of first and second current modulating structures 30, 31 has a non-uniform cross-layer resistance, $R_C$, to the flow of electrons through the layer. Alternatively, and more typically, first current modulating structure 30 and second current modulating structure 31 each have a non-uniform cross-layer resistance, $R_C$, to the flow of electrons through the respective layers. Without being bound by any particular theory, it is presently believed that spatially varying the cross-layer resistance, $R_C$, of first current modulating structure 30 and second current modulating structure 31, spatially varying the cross-layer resistance, $R_C$, of the first current modulating structure 30, or spatially varying the cross-layer resistance, $R_C$, of the second current modulating structure 31 improves the switching performance of the device by providing a more uniform potential drop or a desired non-uniform potential drop across the device, over the area of the device.

In one exemplary embodiment, current modulating structure 30 and/or 31 is a composite comprising at least two materials possessing different conductivities. For example, in one embodiment the first material is a resistive material having a resistivity in the range of about $10^4$ Ω·cm to $10^{10}$ Ω·cm and the second material is an insulator. By way of further example, in one embodiment the first material is a resistive material having a resistivity of at least $10^4$ Ω·cm and the second material has a resistivity that exceeds the resistivity of the first by a factor of at least $10^2$. By way of further example, in one embodiment the first material is a resistive material having a resistivity of at least $10^4$ Ω·cm and the second material has a resistivity that exceeds the resistivity of the first by a factor of at least $10^3$. By way of further example, in one embodiment the first material is a resistive material having a resistivity of at least $10^4$ Ω·cm and the second material has a resistivity that exceeds the resistivity of the first by a factor of at least $10^4$. By way of further example, in one embodiment the first material is a resistive material having a resistivity of at least $10^4$ Ω·cm and the second material has a resistivity that exceeds the resistivity of the first by a factor of at least $10^5$. By way of further example, in one embodiment, at least one of current modulating structures 30, 31 comprises a first material having a resistivity in the range of $10^4$ to $10^{10}$ Ω·cm and a second material that is an insulator or has a resistivity in the range of $10^{10}$ to $10^{14}$ Ω·cm. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^3$. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^4$. By way of further example, in one embodiment, at least one of current modulating structures 30, 31 comprises a first material having a resistivity in the range of $10^4$ to $10^{10}$ Ω·cm and a second material having a resistivity in the range of $10^{10}$ to $10^{14}$ Ω·cm wherein the resistivities of the first and second materials differ by a factor of at least $10^5$. In each of the foregoing exemplary embodiments, each of current modulating structures 30, 31 may comprise a first material having a resistivity in the range of $10^4$ to $10^{10}$ Ω·cm and a second material that is insulating.

Depending upon the application, the relative proportions of the first and second materials in current modulating structure 30 and/or 31 may vary substantially. In general, however, the second material (i.e., the insulating material or material having a resistivity of at least $10^{10}$ Ω·cm) constitutes at least about 5 vol % of at least one of current modulating structures 30, 31. For example, in one embodiment the second material constitutes at least about 10 vol % of at least one of current modulating structures 30, 31. By way of further example, in one embodiment the second material constitutes at least about 20 vol % of at least one of current modulating structures 30, 31. By way of further example, in one embodiment the second material constitutes at least about 30 vol % of at least one of current modulating structures 30, 31. By way of further example, in one embodiment the second material constitutes at least about 40 vol % of at least one of current modulating structures 30, 31. In general, however, the second material will typically not constitute more than about 70 vol % of either of current modulating structures 30, 31. In each of the foregoing embodiments and as previously discussed, the second material may have a resistivity in the range of $10^{10}$ to $10^{14}$ Ω·cm and the resistivities of the first and second materials (in either or both of current modulating structures 30, 31) may differ by a factor of at least $10^3$.

In general, first and second current modulating structures 30, 31 may comprise any material exhibiting sufficient resistivity, optical transparency, and chemical stability for the intended application. For example, in some embodiments, current modulating structures 30, 31 may comprise a resistive or insulating material with high chemical stability. Exemplary insulator materials include alumina, silica, porous silica, fluorine doped silica, carbon doped silica, silicon nitride, silicon oxynitride, hafnia, magnesium fluoride, magnesium oxide, poly(methyl methacrylate) (PMMA), polyimides, polymeric dielectrics such as polytetrafluoroethylene (PTFE) and silicones. Exemplary resistive materials include zinc oxide, zinc sulfide, titanium oxide, and gallium (III) oxide, yttrium oxide, zirconium oxide, aluminum oxide, indium oxide, stannic oxide and germanium oxide. In one embodiment, one or both of first and second current modulating structures 30, 31 comprise one or more of such resistive materials. In another embodiment, one or both of first and second current modulating structures 30, 31 comprise one or more of such insulating materials. In another embodiment, one or both of first and second current modulating structures 30, 31 comprise one or more of such resistive materials and one or more of such insulating materials.

The thickness of current modulating structures 30, 31 may be influenced by the composition of the material comprised by the structures and its resistivity and transmissivity. In some embodiments, current modulating structures 30 and 31 are transparent and each have a thickness that is between about 50 nm and about 1 micrometer. In some embodiments, the thickness of current modulating structures 30 and 31 is between about 100 nm and about 500 nm. In general, thicker or thinner layers may be employed so long as they provide the necessary electrical properties (e.g., conductivity) and optical properties (e.g., transmittance). For certain applications it will generally be preferred that current modulating structures 30 and 31 be as thin as possible to increase transparency and to reduce cost.

Lithium Nickel Oxide Layer Preparation

In one embodiment, anodic electrochromic lithium nickel oxide compositions may be prepared from a liquid mixture containing lithium, nickel, at least one Group 5 metal, and optionally one or more bleached state stabilizing element(s) as previously described. For example, in one embodiment, the liquid mixture is deposited on the surface of a substrate to form a film comprising lithium, nickel, at least one Group 4 metal, and optionally at least one bleached state stabilizing element and the deposited film is then treated to form an anodic electrochromic lithium nickel oxide layer containing lithium, nickel, the Group 4 metal(s) (and optionally one or more bleached state stabilizing elements). In such embodiments, the relative amounts of lithium, nickel, titanium, zirconium and hafnium and bleached state stabilizing element(s) in the liquid mixture are controlled to provide an atomic ratio of lithium to the combined amount of nickel and Group 4 metal(s) and bleached state stabilizing element(s) in the deposited film is generally at least about 0.4:1, respectively, as previously described.

The liquid mixture may be prepared by combining, in a solvent system, a source of lithium, nickel, and at least one Group 4 metal. In general, the source (starting) materials for each of the lithium, nickel and Group 4 metal(s) comprised by the liquid mixture are soluble or dispersible in the liquid mixture solvent system and provide a source of metal(s) or metal oxide(s) for the lithium nickel oxide film. In one embodiment, the liquid mixture is passed through a 0.2 micron filter prior to the coating step.

The lithium component of the liquid mixture may be derived from a range of soluble or dispersible lithium-containing source (starting) materials that chemically or thermally decompose to provide a source of lithium. For example, the source of lithium for the liquid mixture may comprise a lithium derivative of an organic compound (e.g., an organolithium compound) or a lithium salt of an inorganic anion such as hydroxide, carbonate, nitrate, sulfate, peroxide, bicarbonate and the like.

A wide variety of lithium derivatives of organic compounds are described in the literature and are useful as lithium sources for the liquid mixtures of this invention. They include lithium derivatives of alkanes (alkyl lithium compounds), aromatic compounds (aryl lithium compounds), olefins (vinyl or allyl lithium compounds), acetylenes (lithium acetylide compounds), alcohols (lithium alkoxide compounds), amines, (lithium amide compounds), thiols (lithium thiolate compounds), carboxylic acids (lithium carboxylate compounds) and β-diketones (β-diketonate compounds). Since the role of the lithium compound is to provide a soluble source of lithium ion in the lithium nickel oxide layer, the organic portion of the organo-lithium compound is removed during processing; it preferred to utilize the simple, low cost, and readily available organo-lithium compounds. It is further preferred that the organolithium compound be one that is not pyrophoric when exposed to air; this property limits but does not exclude the use of alkyl, aryl, vinyl, allyl, acetyllde organolithium reagents as lithium sources in the liquid mixtures of this invention. In one embodiment, the source (starting) material for the lithium component of the liquid mixture is a lithium amide compound corresponding to the formula $LiNR^1R^2$ wherein $R^1$ and $R^2$ are hydrocarbyl, substituted hydrocarbyl, or silyl, and optionally, $R^1$ and $R^2$ and the nitrogen atom to which they are bonded may form a heterocycle.

In an alternative embodiment, the source (starting) material for the lithium component of the liquid mixture is a lithium alkoxide corresponding to the formula LiOR wherein R is hydrocarbyl, substituted hydrocarbyl, or optionally substituted silyl. In one such embodiment, the source (starting) material for the lithium component of the liquid mixture is a lithium alkoxide corresponding to the formula LiOR wherein R is optionally substituted alkyl or aryl. For example, in one such embodiment, R is linear, branched or cyclic alkyl. By way of further example, in one such embodiment, R is 2-dimethylaminoethyl. By way of further example, in one such embodiment, R is 2-methoxyethyl. By way of further example, in one such embodiment, R is optionally substituted aryl. In another embodiment, the source (starting) material for the lithium component of the liquid mixture is a lithium carboxylate corresponding to the formula $LiOC(O)R^1$ wherein $R^1$ is hydrogen, hydrocarbyl, substituted hydrocarbyl, heterocyclo or optionally substituted silyl. For example, in one such embodiment $R^1$ is methyl (lithium acetate). By way of further example, in one such embodiment, $R^1$ is linear or branched alkyl. By way of further example, in one such embodiment, $R^1$ is cyclic or polycyclic. By way of further example, in one such embodiment, $R^1$ is optionally substituted aryl. In another embodiment, the source (starting) material for the lithium component of the liquid mixture is a lithium β-diketonate corresponding to the formula

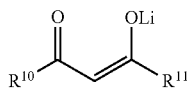

Wherein $R^{10}$ and $R^{11}$ are independently hydrocarbyl, substituted hydrocarbyl, or optionally substituted silyl. For example, in one such embodiment, $R^{10}$ and $R^{11}$ are independently linear or branched alkyl. By way of further example, in one such embodiment, $R^{10}$ and $R^{11}$ are independently cyclic or polycyclic.

In one embodiment, the source (starting) material for the lithium component of the liquid mixture comprises a lithium salt of an anion containing nickel or a bleached state-stabilizing element. For example, in one such embodiment, the source (starting) material for the lithium component of the liquid mixture comprises a lithium salt of a polyoxometallate or a Keggin anion, e.g., a heteropolytungstate or a heteropolymolybdate. Alternatively, in one such embodiment, the source (starting) material for the lithium component of the liquid mixture comprises a lithium salt, or an adduct of a lithium salt such as an etherate of a lithium salt, of an anionic coordination complex of nickel and/or a bleached state stabilizing element. For example, in one such embodiment, the lithium salt is a lithium salt of a coordination complex corresponding to the formula $[M^4(OR^2)_4]^-$, $[M^5(OR^2)_5]^-$, $[M^6(OR^2)_6]^-$, or $[L_nNiX^1X^2X^3]^-$ where L is a neutral mono- or polydentate Lewis base ligand $M^4$ is B, Al, Ga, or Y, $M^5$ is Ti, Zr, or Hf, $M^6$ is Nb or Ta, n is the number of neutral ligands, L, that are coordinated to the Ni center, and each $R^2$ is independently hydrocarbyl, substituted hydrocarbyl, or substituted or unsubstituted hydrocarbyl silyl, $X^1$, $X^2$, and $X^3$ are independently an anionic organic or inorganic ligand.

In one such embodiment, $X^1$, $X^2$, and $X^3$ are independently halide, alkoxide, diketonate, amide and any two L or X ligands can be joined tethered via a bridging moiety to form a chelating ligands.

The nickel component of the liquid mixture may be derived from a range of soluble or dispersible nickel-containing source (starting) materials that chemically or thermally decompose to provide a source of nickel. For example, the source of nickel for the liquid mixture may comprise a nickel derivative of an organic compound (e.g., an organonickel compound) or a nickel salt of an inorganic anion such as hydroxide, carbonate, hydroxycarbonate, nitrate, sulfate, or hybrids comprising both organic and inorganic ligands.

A wide variety of organonickel compounds are described in the literature and are useful as nickel sources for the liquid mixtures of this invention. In a preferred embodiment, the source material is dissolved in the liquid mixture to form a homogeneous solution that is filterable through a 0.2 micron filter. For example, in one embodiment the nickel source is a zero valent organonickel compound. Suitable zero valent organonickel compounds include bis(cyclooctadiene)Ni.

More commonly, organonickel compounds where the nickel center is in a formal oxidation state of 2+(Ni(II)) are used as sources of nickel in the liquid mixtures of this invention. Exemplary Ni(II) complexes further organic-ligand stabilized Ni(II) complexes corresponding to the formula $L_nNiX^4X^5$ wherein L is a neutral Lewis base ligand, n is the number of neutral Lewis ligands coordinated to the Ni center, and $X^4$ and $X^5$ are independently an organic or inorganic anionic ligand. For example, in one such embodiment, the nickel source corresponds to the formula $L_nNiX^4X^5$ wherein each L is independently a Lewis base ligand such as amine, pyridine, water, THF or phosphine and $X^4$ and $X^5$ are independently a hydride, alkyl, alkoxide, allyl, diketonate, amide or carboxylate ligand and any two L or X ligands can be joined via a bridging moiety to form a chelating ligand. Exemplary Ni(II) complexes include Ni(II) complexes such as bis(cyclopentadienyl)Ni(II) complexes, Ni(II) allyl complexes including mixed cyclopentadienylNI(II)allyl complexes, bis(aryl)N(II) complexes such as bis(mesityl)Ni(II), bis(acetate)Ni(II), bis(2-ethylhexanoate)Ni(II), bis(2,4 pentanedionato)Ni(II), and neutral Lewis base adducts thereof.

In one embodiment, the source (starting) material for the nickel component of the liquid mixture comprises hydrolysable nickel compositions. Hydrolysable nickel precursors are readily soluble in a variety of solvents including common organic solvents and react with moisture to form $Ni(OH)_2$, and liberate the anionic ligand in its protonated form (e.g., X—H) The ligand imparts solubility in organic solvents such as aliphatic and aromatic hydrocarbons, ethers, and alcohols and generally affects the reactivity of the nickel complex. A key functional characteristic of the hydrolysable nickel precursor is to convert into a nickel hydroxide or oxide when exposed to water vapor at low temperature (e.g., below 150° C.). Preferred hydrolysable nickel precursors are prepared using Ni-complexes that are stabilized by substituted alkoxide ligands derived from alcohols of the following general formulae:

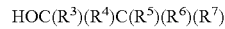

wherein $R^3$, $R^4$, $R^5$, $R^6$, and $R^7$ are independently substituted or unsubstituted hydrocarbyl groups, at least one of $R^3$, $R^4$, $R^5$, $R^6$, and $R^7$ comprises an electronegative heteroatom, and where any of $R^3$, $R^4$, $R^5$, $R^6$, and $R^7$ can be joined to form ring. The preferred electronegative heteroatoms are oxygen or nitrogen. Preferred alkoxide ligands $[^-OC(R^3)(R^4)C(R^5)(R^6)(R^7)]$ are derived from alcohols in which one or more $R^5$, $R^6$, and $R^7$ is an ether or amine functional group. An exemplary alkoxide ligand is the one derived from 1-dimethylamino-2-propanol (DMAP): $HOCH(Me)CH_2NMe_2$. By way of further example, in one embodiment the nickel composition is a hydrolysable nickel composition corresponding to the formula:

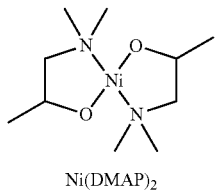

Ni(DMAP)$_2$

In one embodiment, the source (starting) material(s) for the nickel component of the liquid mixture is soluble or dispersible in the liquid mixture and that chemically or thermally decomposes to provide a source of at least one Group 4 metal and/or at least one bleached state stabilizing element in addition to nickel. For example, in one such embodiment the source material for the nickel component of the liquid mixture is an organic-ligand stabilized metal complex or an inorganic salt containing at least one such Group 5 metal and/or at least one such bleached state stabilizing element. For example, the salt may be a halide, nitrate, hydroxide, carbonate, or sulfate salt or an adduct thereof (e.g., acid, ether, amine or water adducts). In one preferred embodiment, the Group 4 metal(s) and bleached state stabilizing element(s) is/are selected from the group consisting of organic derivatives of Y, Ti, Zr, Hf, V, Nb, Ta, Mo, W, B, Al, Ga, In, Si, Ge, Sn, Sb and combinations thereof. As previously mentioned, a wide variety of organic-ligand stabilized derivatives of these elements are known in the literature and useful as components of the liquid mixtures of this invention. These include, preferably, of complexes where the stabilizing organic ligands are alkoxides, carboxylates, diketonates, amides. For metals having higher oxidations states such as the Group VI metals, oxo-derivatives comprising anionic organic ligands such as alkoxides are preferred including the $(RO)_4MO$, and $(RO)_2MO_2$ where M is Mo or W, O is oxygen, and R is a hydrocarbyl, substituted hydrocarbyl, or hydrocarbyl or substituted hydrocarbyl silyl group.

In one embodiment, the source (starting) material(s) for the Group 4 metal(s) of the liquid mixture comprises a Group 4 metal-containing composition that is soluble or dispersible in the liquid mixture and that chemically or thermally decomposes to provide a source of the Group 4 metal(s) for the lithium nickel oxide film that is filterable through a 0.2 micron filter prior to the coating step. For example, in one embodiment the Group 4 metal source is an organic-ligand stabilized metal complex or an inorganic salt. For example, the salt may be a halide, nitrate, hydroxide, carbonate, or sulfate salt or an adduct thereof (e.g., acid, ether, amine or water adducts). As previously noted, such as complex(es) may also contain nickel in addition to the Group 4 metal(s). In one preferred embodiment, the Group 4 metal(s) is/are selected from the group consisting of organic derivatives of Ti, Zr, Hf and combinations thereof. As previously mentioned, a wide variety of organic-ligand stabilized derivatives of these elements are known in the literature and useful as components of the liquid mixtures of this invention. These include, preferably, of complexes where the stabilizing organic ligands are alkoxides, carboxylates, diketonates, amides.

In one embodiment, the source (starting) material(s) for the bleached state stabilizing element(s) of the liquid mixture comprises a bleached state stabilizing element-containing composition that is soluble or dispersible in the liquid mixture and that chemically or thermally decomposes to provide a source of the bleached state stabilizing element(s) for the lithium nickel oxide film that is filterable through a 0.2 micron filter prior to the coating step. For example, in one embodiment the bleached state stabilizing element source is an organic-ligand stabilized metal complex or an inorganic salt. For example, the salt may be a halide, nitrate, hydroxide, carbonate, or sulfate salt or an adduct thereof (e.g., acid, ether, amine or water adducts). As previously noted, such as complex(es) may also contain nickel in addition to the bleached state stabilizing element(s). In one preferred embodiment, the bleached state stabilizing element(s) is/are selected from the group consisting of organic derivatives of Y, V, Nb, Ta, Mo, W, B, Al, Ga, In, Si, Ge, Sn, Sb and combinations thereof. As previously mentioned, a wide variety of organic-ligand stabilized derivatives of these elements are known in the literature and useful as components of the liquid mixtures of this invention. These include, preferably, of complexes where the stabilizing organic ligands are alkoxides, carboxylates, diketonates, amides. For metals having higher oxidations states such as the Group VI metals, oxo-derivatives comprising anionic organic ligands such as alkoxides are preferred including the $(RO)_4MO$, and $(RO)_2MO_2$ where M is Mo or W, O is oxygen, and R is a hydrocarbyl, substituted hydrocarbyl, or hydrocarbyl or substituted hydrocarbyl silyl group. By way of further example, in one such embodiment, the liquid mixture comprises at least bleached state stabilizing element(s) selected from the group consisting of Y, Mo, V, Nb, Ta, W, B, Al, Ga, In, Si, Ge, Sn, Sb and combinations thereof.

The solvent system may comprise a single solvent or a mixture of solvents in which the lithium, nickel and bleached state stabilizing element(s) are dissolved or dispersed. In embodiment, the solvent system comprises a protic solvent including water, and protic organic solvents such as alcohols, carboxylic acids and mixtures thereof. Exemplary protic organic solvents include methanol, ethanol, 2,2,2-trifluouro-ethanol, 1-propanol, 2-propanol, 1-butanol, and 2-ethoxyethanol; stearic acid, oleic acid, oleamine, and octadecylamine and the like, and mixtures thereof. In another embodiment, the solvent system comprises a polar or nonpolar aprotic solvent. For example, in one such embodiment the solvent system may comprise an alkane, and olefin, an aromatic, an ester or an ether solvent or a combination thereof. Exemplary non-polar aprotic solvents include hexane, octane, 1-octadecene, benzene, toluene, xylene, and the like. Exemplary polar aprotic solvents include, for example, N,N-dimethylformamide; 1,3-dimethyl-2-imidazolidinone; N-methyl-2-pyrrolidinone; acetonitrile; dimethylsulfoxide; acetone; ethyl acetate; benzyl ether, trioctylphonphine, and trioctylphosphine oxide, and the like, and mixtures thereof. Exemplary ethereal solvents include, for example, diethyl ether, 1,2-dimethoxyethane, methyl-tert-butyl ether, tetrahydrofuran, 1,4-dioxane, and the like, and mixtures thereof.

The liquid mixture may be formed by introducing the lithium, nickel, Group 4 metal and (optional) bleached state stabilizing element source materials into the solvent system at a temperature typically in the range of about 25° C. to 350° C. Depending upon their chemical composition and stability, the lithium, nickel and Group 4 metal source materials may be dissolved or dispersed in the solvent system under an inert atmosphere. In a preferred case the lithium, nickel, and Group 4 metal(s) are alkoxides that are hydrolysable, the preferred solvents are alcohols, and the liquid mixture is prepared in an inert atmosphere to prevent hydrolysis and the formation of precipitates prior to the film deposition process. In certain other embodiments, however, the lithium, nickel and Group 4 metal source materials may be dissolved or dispersed in the solvent system in air or a synthetic air ($N_2/O_2$) ambient. Independent of ambient, the sequence in which the lithium, nickel and Group 4 metal source material(s) are introduced to the solvent system to form the liquid mixture is not narrowly critical. Thus, for example, in certain embodiments they may be combined with each other, or the solvent system in any sequence. By way of further example, in one embodiment, the lithium, nickel and Group 4 metal source materials for the liquid mixture are three separate, chemically distinct materials. In another embodiment, at least one of the source (starting) materials constitutes a source of a combination of at least two of lithium, nickel, and Group 4 metal(s), e.g., (i) lithium and nickel, (ii) lithium and a Group 4 metal, (iii) nickel and a Group 4 metal, (iv) at least one Group 4 metal and another Group 4 metal or a bleached state stabilizing element or (v) lithium, nickel and at least one Group 4 metal.

The solvent system may also contain a range of additives. For example, the liquid mixture may contain solubility enhancers and complexing agents that stabilize the liquid mixture thermally and hydrolytically, such as organic acids, organic carbonates, and amines and polyethers. The liquid mixture may also contain wetting agents such as propylene glycol for enhancing the quality of the layers derived from the liquid mixture. In general, simple variation of lithium, nickel, and bleached state stabilizing element components in a solvent system will produce homogeneous solutions that can be filtered through a 0.2 micron filter without substantial loss of mass or change in the lithium, nickel, Group 4 metal(s) and optional bleached state stabilizing element composition.

When the liquid mixture solvent system is aqueous, the use of readily available, water soluble, lithium, bleached state metal, and nickel precursors may be preferred. Exemplary lithium and nickel precursors in this embodiment include simple inorganic salts such as the nitrates, hydroxides, and carbonates, or salts of organic acids such as the acetates. Exemplary lithium precursors in this embodiment include simple inorganic salts such as lithium nitrate and lithium hydroxide or air stable organic salts such as lithium acetate. In certain such embodiments, lithium acetate is sometimes preferred. Exemplary nickel precursors in this embodiment include simple inorganic salts such as nickel nitrate, nickel hydroxide, and nickel carbonate; or air stable organic salts such as nickel acetate or nickel dienoate compounds (e.g., bis(2-ethylhexanoate)Ni(II)) with nickel acetate being preferred in certain embodiments). Exemplary bleached state metal precursor(s) in this embodiment include simple inorganic, oxide precursors such as the metal chlorides, alkoxides, peroxos, oxos or salts of organic acids such as acetic, lactic, citric or oxalic acid or of these inorganic and organic ligands in combination. For example, when the liquid mixture comprises tungsten, tungsten(oxo)tetra(isopropoxide) and ammonium metatungstate can be used with ammonium metatungstate being preferred in certain embodiments. When the liquid mixture comprises titanium, ammonium titanium lactate is preferred in certain embodiments. When the liquid mixture comprises zirconium, zirconyl nitrate and zirconium acetate hydroxide may be used in certain embodiments with zirconyl nitrate being sometimes preferred. When the liquid mixture comprises niobium, ammonium niobate oxalate or niobium peroxo complexes may be used with peroxo complexes being sometimes preferred.

In some embodiments, the formation of stable solutions of lithium, nickel and other metals may be aided by the use of acids to minimize or even avoid precipitation when the various lithium, nickel and metal precursors are combined. Common inorganic acids such as hydrochloric and nitric acid and organic acids such as lactic, citric, and glyoxylic acid may be used for this purpose with citric acid being preferred in certain embodiments. One of skill in the art will appreciate that certain organic acids will both lower the pH of the liquid mixture and minimize precipitation and that simple variation of the choice and concentration of organic acid will sometimes lead to acceptable (stable, precipitate-free solutions) and will sometimes lead to non-acceptable (substantial precipitation) liquid mixtures. For example, when glyoxylic acid is used to lower the pH of the solution, a precipitate is often formed upon combination with one or more of the liquid mixture precursors. In some cases the pH is adjusted to promote the dissolution of all the metal precursors in the mixture by the addition of base such as ammonium hydroxide. The pH is preferably not adjusted above the pH at which any of the components precipitate from the solution.

When aqueous liquid mixtures are used, the addition of wetting agent additives is often preferred for improving the film quality of the lithium mixed-metal nickel oxide material. Classes of additives include polymers such as polyethers or polyols (e.g., polyethylene glycol), alcohols such as ethanol or butanol, esters such as ethyl acetate, amino alcohols such as N,N-diethylamino ethanol, mixed alcohol ethers such as 2-ethoxyethanol, glycols such as propylene glycol with propylene glycol propyl ether and propylene glycol monomethyl ether acetate typically being selected.

When the liquid mixture solvent system is an organic solvent, a polar organic solvent such as an alcohol, an ether solvent system, or a non-polar organic solvent such as toluene, hexane may be used. When a polar solvent is used, the use of organometallic complexes of lithium, nickel and other metal precursors is generally preferred. Exemplary lithium, nickel and other metal precursors include hydrolyzable complexes such as alkoxides, aminoalkoxides, diolates, or amides that readily react to water, converting to hydroxides. Exemplary lithium and nickel precursors include their (N,N-dimethylamino-isopropoxide) complexes. Exemplary Group 4, Group 5, Group 6 and other bleached state element precursors include alkoxides, such as ethoxides, isopropoxides, butoxides, oxyalkoxides, or chloroalkoxides that are compatibly soluble with lithium and nickel precursors and preferably with no precipitation. One exemplary method for forming liquid mixtures in a polar organic solvent, such as an alcohol solvent, comprises combining alkoxide complexes of lithium, bleached state metal(s), and nickel between 25 and 80 C in an inert atmosphere.

When hydrolysable metal precursors are used, the coating solutions are readily reactive to moisture in air, resulting in precipitation of their metal hydroxides, oxide or carbonates. Therefore, addition of polar organic solvents that can moderate hydrolysis is sometimes preferred method for stabilizing these solutions. Classes of additives include chelating alcohols or amino alcohols such as 2-methoxyethanols, dimethylaminoethanol, or propyl amino ethanols, glycols such as propylene glycol, or ethylene glycol, low-pKa solvents such as hexafluoropropanol with propylene glycol or propylene carbonate are sometimes preferred.

In accordance with one aspect of the present invention, electrochromic anodic layers may be prepared from the liquid mixtures in a series of steps. In general, a film is formed from the liquid mixture on a substrate, solvent is evaporated from the liquid mixture, and the film is treated to form the electrochromic anodic layer. In one such embodiment, the film is thermally treated to form the electrochromic anodic layer.

The liquid mixture may be deposited onto any substrate having suitable optical, electrical, thermal, and mechanical properties. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protection coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass.

In one embodiment, the substrate comprises a transparent conductive oxide layer (as described in connection with FIG. 1) on glass, plastic, metal, and metal coated glass or plastic. In this embodiment, the liquid mixture may be deposited directly onto the surface of the transparent conductive oxide.

In another embodiment, the substrate comprises a current modulating layer (as described in connection with FIG. 2) on glass, plastic, metal, and metal coated glass or plastic. In this embodiment, the liquid mixture may be deposited directly onto the surface of the current modulating layer.

In another embodiment, the substrate comprises a ion conductor layer (as described in connection with FIG. 1) on glass, plastic, metal, and metal coated glass or plastic. In this embodiment, the liquid mixture may be deposited directly onto the surface of the ion conductor layer.

A range of techniques may be used to form a layer that is derived from the liquid mixture on the substrate. In one exemplary embodiment, a continuous liquid layer of the liquid mixture is applied to the substrate by meniscus coating, roll coating, dip coating, spin coating, screen printing, spray coating, ink jet coating, knife over roll coating (gap coating), metering rod coating, curtain coating, air knife coating, and partial immersion coating and like, and solvent is then removed. Alternatively, the layer may be formed by directing droplets of the liquid mixture toward the substrate by spray or ink jet coating, and removing solvent. Regardless of technique, a layer is formed on the substrate containing lithium, nickel and at least one Group 5 metal in the ratios previously described herein in connection with the electrochromic lithium nickel oxide layers. That is, the relative amounts of lithium, nickel, titanium, zirconium and hafnium in the layer are controlled such that an atomic ratio of lithium to the combined amount of nickel and Group 5 metal(s) and the atomic ratio of the combined amount of all Group 5 metal(s) to nickel is as previously described.

In those embodiments in which the lithium composition, nickel composition and/or Group 4 metal (and optional bleached state stabilizing element) composition(s) are hydrolysable, it may be desirable to form the layer on the substrate in a controlled atmosphere. For example, in one embodiment, deposition of the liquid mixture occurs in an atmosphere having a relative humidity (RH) of less than 55% RH. By way of further example, in one such embodiment, deposition of the liquid mixture occurs in an atmosphere having a relative humidity not in excess of 40% RH By way of further example, in one such embodiment, deposition of the liquid mixture occurs in an atmosphere having a relative humidity not in excess of 30% RH. By way of further example, in one such embodiment, deposition of the liquid mixture occurs in an atmosphere having a relative humidity not in excess of 20% RH. By way of further example, in one such embodiment, deposition of the liquid mixture occurs in an atmosphere having a relative humidity not in excess of 10% RH or even not in excess of 5% RH. In some embodiments, the atmosphere may be even drier; for example, in some embodiments, deposition may occur in a dry atmosphere defined by a RH of less than 5% RH, less than 1% RH, or even less than 10 ppm water.

The deposition of the liquid mixture onto the substrate may be carried out in a range of atmospheres. In one embodiment, the liquid mixture is deposited in an inert atmosphere (e.g., nitrogen or argon) atmosphere. In an alternative embodiment, the liquid mixture is deposited in an oxygen-containing atmosphere such as compressed dry air or synthetic air (consisting of a mixture of oxygen and nitrogen in approximately 20:80 v/v ratio). In certain embodiments, for example, when the liquid mixture comprises a hydrolysable precursor for the lithium, nickel, and/or Group 4 metal(s), performance may be improved by minimizing the liquid mixture's and the deposited film's exposure to $CO_2$. For example, in some embodiments the ambient may have a $CO_2$ concentration of less than 50 ppm, less than 5 ppm or even less than 1 ppm.

The temperature at which the liquid mixture is deposited onto the substrate may range from near room temperature to elevated temperatures. For spray coating, for example, the maximum high temperature would be limited by the substrate stability (e.g., 550 to 700° C. for glass, less than 250° C. for most plastics, etc.) and the desired annealing temperature for the layer. For coating techniques in which a continuous liquid film is applied to a substrate, for example, coating temperatures will typically be in range of room temperature 25° C. to about 80° C.

After the substrate is coated with the liquid mixture, the resulting films may be placed under an air stream, vacuum, or heated to achieve further drying in order to remove residual solvent. The composition of the ambient atmosphere for this step may be controlled as previously described in connection with the coating step. For example, the atmosphere may have a relative humidity of less than 1% to 55% RH, it may be an inert atmosphere (nitrogen or argon), or it may contain oxygen.

In those embodiments in which the liquid mixture contains a hydrolysable precursor for the lithium, nickel, or Group 4 metal, the coated substrate may then be exposed to a humid atmosphere (e.g., a RH of at least 30% RH) to hydrolyze the metal complex(es) to form a protonated ligand bi-product and a lithium nickel polyhydroxide film. Such exposure may be carried out, for example, at a temperature in the range about 40° C. to about 200° C. for a period of about 5 minutes to about 4 hours. In some embodiments, a second thermal processing step at temperatures above 200° C., preferably above 250° C., to form an oxide film having substantially lower levels of hydroxide content.

In one embodiment, the coated substrate is heat-treated (annealed) to form the electrochromic lithium nickel oxide layer. Depending upon the composition of the liquid mixture and the substrate stability, the coated substrate is annealed at a temperature of at least about 200° C. For example, in one embodiment the substrate may be annealed at a temperature at the lower end of this range, e.g., at least about 250° C. but less than about 700° C.; temperatures within this range would be particularly advantageous for polymeric substrates that may lose dimensional stability at greater temperatures. In other embodiments, the coated substrate may be annealed at a temperature in the range about 300° C. to about 650° C. By way of further example, in one such embodiment the coated substrate may be annealed at a temperature in the range of about 350° C. to about 500° C. In general, however, annealing temperatures will typically not exceed about 750° C. The anneal time may range from several minutes (e.g., about 5 minutes) to several hours. Typically, the anneal time will range from about 30 minutes to about 2 hours. Additionally, the annealing temperature may be achieved (i.e., the ramp rate from room temperature to the annealing temperature) over a period ranging from 1 minute to about several hours.

In some embodiments it may be desirable to heat-treat the coated substrate in a controlled atmosphere. For example, in one embodiment, the coated substrate is annealed in an atmosphere having a relative humidity (RH) of about 5% to 55% RH. By way of further example, in one such embodiment, the coated substrate is annealed in an atmosphere having a relative humidity not in excess of 10% RH or even not in excess of 5% RH. In some embodiments, the atmosphere may be even drier; for example, in some embodiments, the coated substrate is annealed in a dry atmosphere defined by a RH of less than 5% RH, less than 1% RH, or even less than 10 ppm water.

In some embodiments, the composition of the carrier gas in which the heat-treatment is carried out may be an inert (e.g., nitrogen or argon) atmosphere. Alternatively, it may contain oxygen (e.g., compressed dry air or synthetic air consisting of a mixture of oxygen and nitrogen in approximately 20:80 v/v ratio) environment. In certain embodiments, performance may be improved by reducing the exposure to $CO_2$ using atmospheres in which the $CO_2$ concentration is less than 50 ppm. For example, in some embodiments the $CO_2$ concentration may be less than 5 ppm or even less than 1 ppm.

The coated substrate may be heat-treated (annealed) by various means. In one embodiment, the coated substrate is heat-treated (annealed) in a rapid thermal annealer in which heating occurs primarily through absorption of radiative energy by the layer and/or the substrate. In another embodiment, the coated substrate is heat-treated (annealed) in a belt furnace in which heating occurs in one or more zones in a continuous process. In another embodiment, the coated substrate is heat-treated (annealed) in a convection oven and furnaces in which heating is achieved in a batch process by a combination of radiative and conductive processes. In another embodiment, the coated substrate is heat-treated (annealed) using a hot plate (bake plate) or surface heating where heating occurs primarily by conduction by placing the substrate on or slightly above a heated surface; examples include proximity baking where the sample is held above a plate using a cushion of air, hard contact baking where the substrate is held to the surface of a heated surface via vacuum or some other method, and soft contact baking where the substrate rests on a heated surface via gravity alone.

In some embodiments, the resulting electrochromic lithium nickel oxide layer has an average thickness between about 25 nm and about 2,000 nm. For example, in one such embodiment the electrochromic lithium nickel oxide layer has a thickness of about 50 nm to about 2,000 nm. By way of further example, in one such embodiment the electrochromic lithium nickel oxide layer has a thickness of about 25 nm to about 1,000 nm. By way of further example, in one such embodiment, the electrochromic lithium nickel oxide layer has an average thickness between about 100 nm and about 700 nm. In some embodiments, the electrochromic lithium nickel oxide layer has a thickness of about 250 nm to about 500 nm.

Depending upon the method of deposition and the solvent system comprised by the liquid mixture, the resulting electrochromic nickel oxide layer may comprise a significant amount of carbon. For example, in one embodiment, the electrochromic nickel oxide material contains at least about 0.01 wt % carbon. By way of further example, in one embodiment the electrochromic nickel oxide material contains at least about 0.05 wt. % carbon. By way of further example, in one embodiment the electrochromic nickel oxide material contains at least about 0.1 wt. % carbon. By way of further example, in one embodiment the electrochromic nickel oxide material contains at least about 0.25 wt. % carbon. By way of further example, in one embodiment the electrochromic nickel oxide material contains at least about 0.5 wt. % carbon. Typically, however, the electrochromic nickel oxide material will generally contain no more than about 5 wt % carbon. Thus, for example, in one embodiment, the electrochromic nickel oxide material will contain less than 4 wt % carbon. By way of further example, in one embodiment the electrochromic nickel oxide material will contain less than 3 wt. % carbon. By way of further example, in one embodiment the electrochromic nickel oxide material will contain less than 2 wt. % carbon. By way of further example, in one embodiment the electrochromic nickel oxide material will contain less than 3 wt. % carbon. Thus, in certain embodiments, the electrochromic nickel oxide material may contain 0.01 wt. % to 5 wt. % carbon. By way of further example, in certain embodiments, the electrochromic nickel oxide material may contain 0.05 wt. % to 2.5 wt. % carbon. By way of further example, in certain embodiments, the electrochromic nickel oxide material may contain 0.1 wt. % to 2 wt. % carbon. By way of further example, in certain embodiments, the electrochromic nickel oxide material may contain 0.5 wt. % to 1 wt. % carbon.

EXAMPLES

The following non-limiting examples are provided to further illustrate the present invention. It should be appreciated by those of skill in the art that the techniques disclosed in the examples that follow represent approaches the inventors have found function well in the practice of the invention, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the invention.

Example 1

Synthesis of Hydrolysable Ni Precursor

Hydrolysable Ni(II) precursor compound (Ni(DMAP)$_2$) has been synthesized by a modification of the known method (Hubert-Pfalzgraf et. al. Polyhedron, 16 (1997) 4197-4203.) To an anhydrous toluene solution (200 mL) of pre-dried N,N-dimethylamino-2-propanol (8.17 g, 0.0787 mol), was added NaH (1.92 g, 0.0800 mol) by small portions in a N$_2$-purged glove box. The mixture was stirred at room temperature for 2 h until it became clear. To this solution was added Ni(NH$_3$)$_6$Cl$_2$ (9.0 g, 0.039 mol), and it was heated at 80° C. for 6 h, affording a dark green solution. Then the solution was evaporated to dryness under reduced pressure, and the resulting solid was re-dissolved in THF (~300 mL) which then was filtered through a gravity funnel. Dark green filtrate solution was concentrated to ⅓ of the initial volume, diluted with Hexanes (50 mL) and then cooled in a freezer (−20° C.). Green needle-shape microcrystals were obtained after one day, which were filtered, and washed with cold Hexanes. Yield 80%. Microanalysis of the crystalline compound is shown in Table 1.

TABLE 1

Microanalysis data for NiDMAP compound.

| Formula | Calculated | Found |
|---|---|---|
| NiDMAP ($NiC_{10}H_{24}N_2O_2$) | C, 45.67<br>H, 9.20<br>N, 10.65 | C, 45.91<br>H, 9.32<br>N, 10.78 |

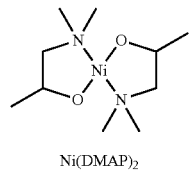

Ni(DMAP)$_2$

Example 2

LiNiO$_2$ Film Synthesis

Figure 3:
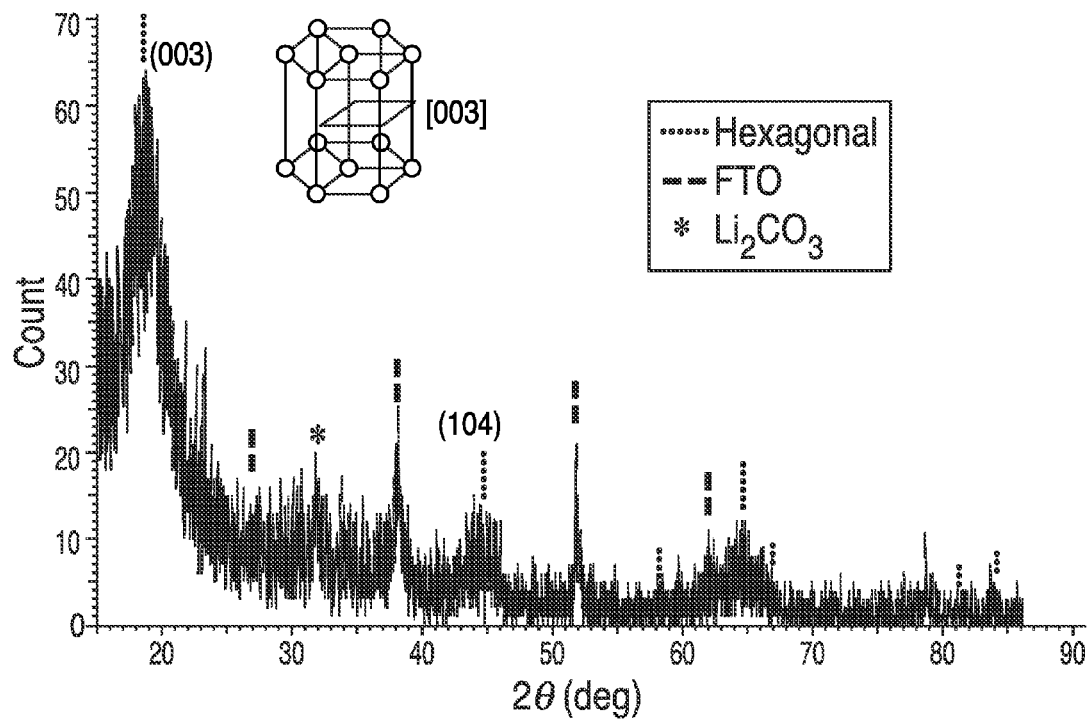
FIG. 3 is a thin-film XRD pattern of an anodic electrochromic film coated on a FTO substrate, measured with the wavelength CuKα=1.540695 Å as described more fully in Example 2.
Figure 4:
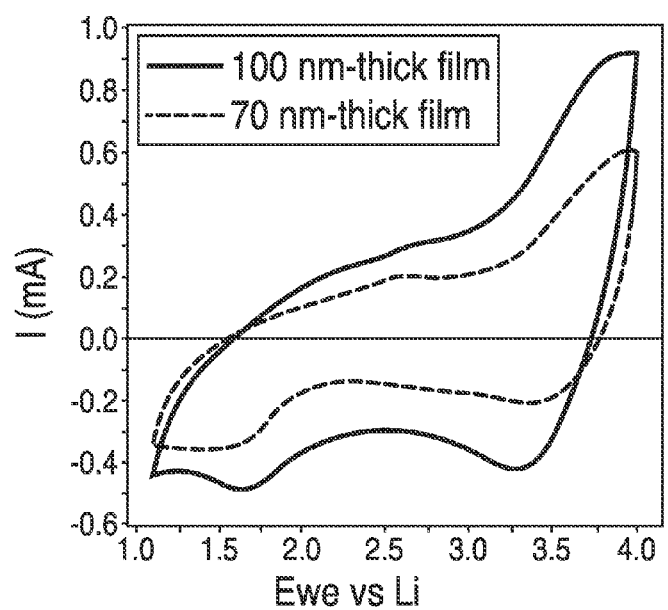
FIG. 4 is a plot of the cyclovoltammetry traces of anodic electrochromic films coated on a FTO substrate in 1 M $LiClO_4$ in propylene carbonate electrolyte using a scan rate of 10 mV/s, as described more fully in Examples 2.

In a 20 mL-scintillated vial, were added NiDMAP (70 mg), LiOMe (11 mg) and anhydrous MeOH (0.6 mL), affording a dark red solution. Then, electrically conductive FTO (fluorinated tin oxide, 20 mm×20 mm×2 mm) coated glass was loaded in a spin-coater in the glove box. Onto the FTO substrate, was dispensed 0.3 mL of the precursor solution through a 0.2 μm filter and spun at 2500 rpm for 1 min. Sealed in a container in order to avoid air-exposure ($CO_2$ and moisture), the coated film was taken out of the box and was hydrolyzed under warm moisture (45° C.) for 1 h in a $N_2$-filled glove bag. Then it was transferred into an $O_2$-purged tube furnace and subsequently dehydrated under $O_2$ at 400° C. for 1 h. After being cooled down, film thickness was measured as 70 nm by profilometry. Structural phase of the coated film was determined by thin-film XRD measurement, which was identified as hexagonal layered LiNiO$_2$ phase exhibiting an intense peak at 2θ=18.79° corresponding to (003) reflection (FIG. 3). Then the film was brought into an Ar-filled glove box, and its electrochromic property was examined in a combined electrochemical/optical setup consisting of a three electrode cell in a cuvette placed in the path of a light source and spectrometer. Data were obtained by cyclovoltammetry with a scan rate 10 mV/s between 1.1 and 4.0 V vs Li/Li$^+$ in an electrolyte of 1M LiClO$_4$ in propylene carbonate. Separate pieces of lithium metal were used as the reference and counter electrodes and optical data were recorded every 1-5 s. The coating showed reversible change in optical transmission at 550 nm from 72% to 16% in 1.1-4.0 V vs Li/Li$^+$, with charge capacity of 30 mC/cm$^2$ and CE (coloration efficiency) of 22 cm$^2$/C (FIG. 4). When the Ni and Li precursor solution was doubly concentrated, a thicker (100 nm) film has been obtained and its reversible CV features remained consistent over the 100 cycles of voltage sweeping affording a high charge capacity (40 mC/cm$^2$). It took a few minutes to get full transmission change between 77% and 9% under fixed voltages which resulted CE of 23 cm$^2$/C. The material bleached to within 95% of its most transparent state at 1.55 V vs. Li/Li$^+$.

Example 3

Li$_2$NiO$_2$ Clear Film Synthesis

In order to isolate the clear state Li$_2$NiO$_2$, a LiNiO$_2$ film (100 nm thick) prepared as described in Example 2, was electrochemically reduced by cycling between 1.1 and 4.0 V in the electrochemical cell under Ar-atmosphere and stopping at 1.1V. Then, the film was taken out of the Ar-box, and was exposed to air while its thin-film XRD was collected by Bruker d8 Advance. After that, the film was brought back into the Ar-glove box, and EC cycling was carried out, which gave result in negligible current flow with no optical transmission change at 550 nm.

Figure 5:
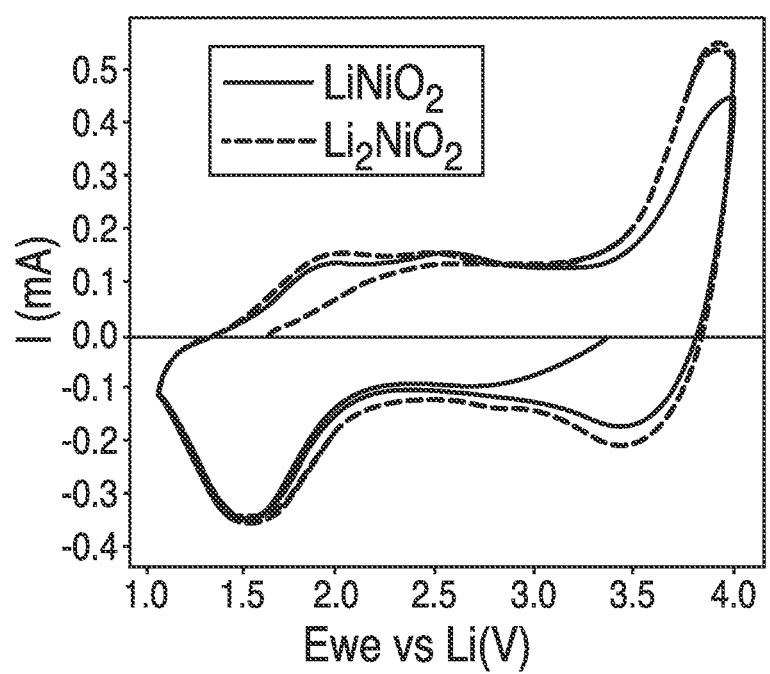
FIG. 5 is a plot of the cyclovoltammetry traces of lithium nickel oxide (labeled $LiNiO_2$) film coated on a FTO substrate and its chemically-reduced film (labeled $Li_2NiO_2$) represented in green and red lines, respectively, measured in 1 M $LiClO_4$ in propylene carbonate electrolyte, as more fully described in Examples 3.

Then, another LiNiO$_2$ film was prepared in the same method as Example 2, and was cycled 5 times between 1.1 and 4.0 V in the electrochemical cell under Ar-atmosphere, affording charge capacity estimated to 23 mC/cm$^2$. The cycling was stopped at 3.6 V, and the film was isolated and subsequently immersed in a freshly-prepared solution of Lithium Benzophenone in THF (deep blue solution) without exposure to air. After 2 days, the film became clear, and its cyclic voltammograms were recorded, affording an identical current flow with its previous LiNiO$_2$ phase between 1.1-4.0 V in the electrochemical cell under Ar-atmosphere. Charge capacity is estimated to 25 mC/cm$^2$ (see FIG. 5).

Examples 4 through 39

Li$_x$M$_y$Ni$_{1-y}$O, Anode Films with Various Compositions

The coating solutions of Li$_x$M$_y$Ni$_{1-y}$O$_z$ were prepared by dissolving weighed amounts of LiDMAP, NiDMAP and a precursor compound of bleach state stabilizing metal, M in 1-BuOH, with the various molar ratios as presented in Table 2, where z is generally believed to be in the range of 1.3 and 3.8. Combined solution molarity of the metal ions [Li+M+Ni] was in the range of 1.8-2.8 M). After filtering the solutions through a 0.2 μm filter, they were spun onto FTO substrates under a N$_2$ atmosphere. The resulting coatings were humidified under 40% RH CDA at room temperature, subsequently calcined for 1 h under the same atmosphere at 400-550° C. temperature range unless otherwise noted.

After being cooled, the films were brought into an Ar-filled glove box, and the electrochromic properties were examined in a combined electrochemical/optical setup consisting of a three electrode cell in a cuvette placed in the path of a white light source and spectrometer. Data were obtained by sequential oxidation and reduction under galvanostatic control followed by constant voltage hold (CC-CV). The electrolyte was 1 M LiClO$_4$ in propylene carbonate. Typically voltage ranges of 1.5-4.2, 2.5-4.2 or 2.5-4.0 V vs Li/Li$^+$ were applied. Separate pieces of lithium metal were used as the reference and counter electrodes. Optical data were recorded every 1-5 s. Coloration Efficiency was calculated from the transmission data (at 550 nm) and the amount of charges passed during the second reduction event of the film over the applied voltage range.

Thin-film X-ray diffraction (XRD) was measured by Bruker D8 Advance diffractometer. Incident beam angles were adjusted to 0.05-0.1° to afford high peak intensity of anode oxide film. Carbon concentration of the calcined films was measured and analyzed by SIMS analysis (Secondary Ion Mass Spectrometry) in the Evans Analytical Group. Metal composition of lithium nickel oxide films was analyzed by digesting the films in hydrochloric acid (Ba internal standard) and performing ICP-OES (Inductively-coupled plasma optical emission spectroscopy, Thermo Electron Iris Intrepid II XPS) analysis.

Figure 6:
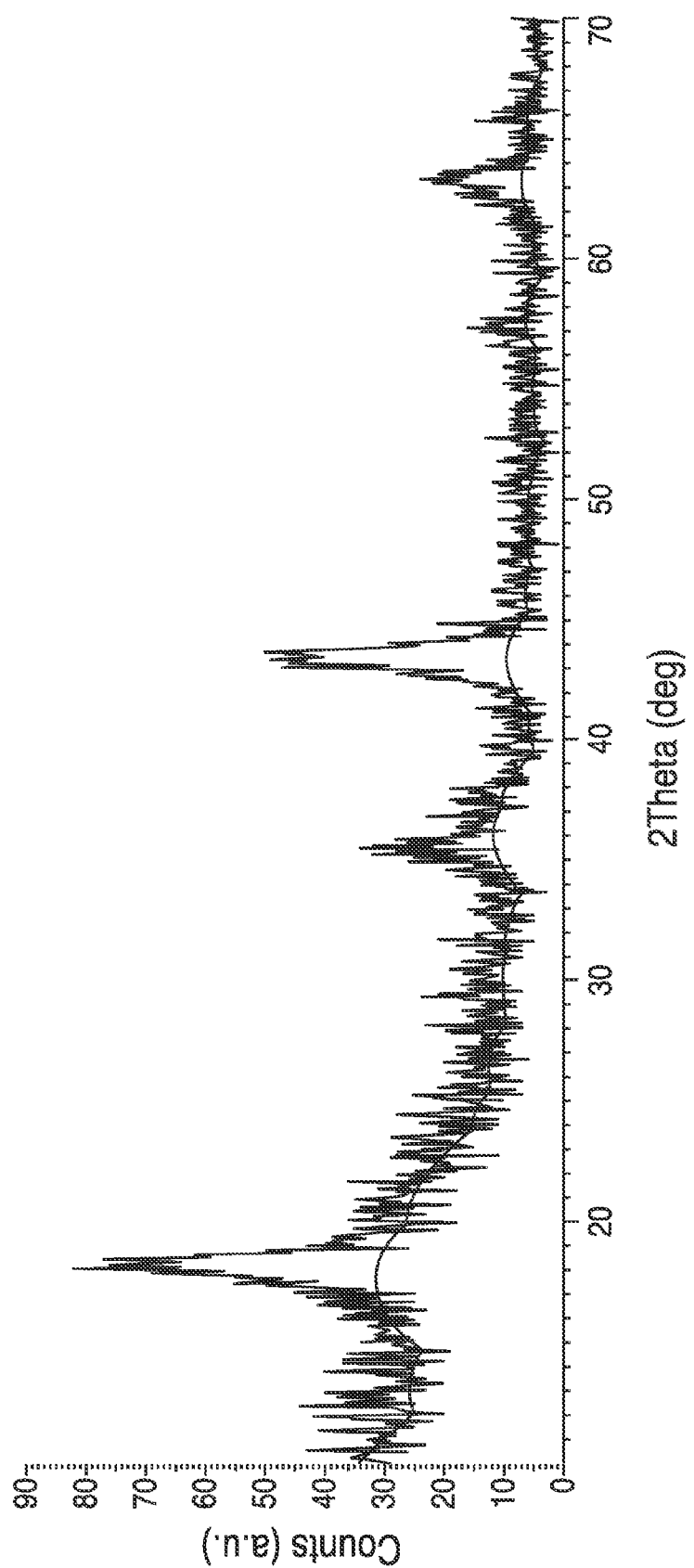
FIG. 6 is a thin-film XRD pattern of $Li_{0.33}Ti_{0.667}Ni_{0.33}O_z$ anodic electrochomic film coated on a FTO substrate, measured with the wavelength CuKα=1.540695 Å as described more fully in Example 11.

Film thickness was measured by profilometer and was in the range of 130-400 nm for all films shown in Table 2. Measured charge capacity data were in the range of 2-28 mC/cm$^2$ over the applied voltage range, and the films switched from a bleached state transmission in the range of 42-88% to a dark state transmission in the range of 79-12% (at 550 nm). Absolute coloration efficiency was in the range of 19-44 cm$^2$/C for all the films in Table 2. Bleached state voltages for selected films are shown in Table 3. Thin-film XRD data for selected films are listed in Table 4, and their typical XRD patterns are shown in FIG. 6. Carbon concentration of the calcined films measured and analyzed by SIMS thin-film analysis are shown in Table 5.

TABLE 2

Various compositions of $Li_xM_yNi_{1-y}O_z$ anode films where M is among group(IV) metals.

| Example No. | Metal | Precursor compound | Li (x) | Ni (1-y) | M (y) |
|---|---|---|---|---|---|
| 4 | Ti | Ti(OiPr)4 | 0.49 | 0.66 | 0.34 |
| 5 | Ti | Ti(OiPr)4 | 0.78 | 0.38 | 0.62 |
| 6 | Ti | Ti(OiPr)4 | 0.91 | 0.91 | 0.09 |
| 7 | Ti | Ti(OiPr)4 | 0.91 | 0.86 | 0.14 |
| 8 | Ti | Ti(OiPr)4 | 1.27 | 0.49 | 0.51 |
| 9 | Ti | Ti(OiPr)4 | 2.182 | 0.687 | 0.313 |
| 10 | Ti | Ti(OiPr)4 | 2.33 | 0.67 | 0.33 |
| 11 | Ti | Ti(OiPr)4 | 0.333 | 0.66667 | 0.333 |
| 12 | Zr | Zr(OEt)4 | 0.9 | 0.75 | 0.25 |
| 13 | Zr | Zr(OEt)4 | 0.92 | 0.81 | 0.19 |
| 14 | Zr | Zr(OEt)4 | 0.92 | 0.58 | 0.42 |
| 15 | Zr | Zr(OEt)4 | 1.1 | 0.67 | 0.33 |
| 16 | Zr | Zr(OEt)4 | 1.13 | 0.79 | 0.21 |
| 17 | Zr | Zr(OEt)4 | 1.13 | 0.7 | 0.3 |
| 18 | Zr | Zr(OEt)4 | 1.2 | 0.75 | 0.25 |
| 19 | Zr | Zr(OEt)4 | 1.2 | 0.67 | 0.33 |
| 20 | Zr | Zr(OEt)4 | 1.38 | 0.81 | 0.19 |
| 21 | Zr | Zr(OEt)4 | 1.38 | 0.72 | 0.28 |
| 22 | Zr | Zr(OEt)4 | 1.38 | 0.62 | 0.38 |
| 23 | Zr | Zr(OEt)4 | 1.4 | 0.75 | 0.25 |
| 24 | Zr | Zr(OEt)4 | 1.4 | 0.67 | 0.33 |
| 25 | Zr | Zr(OEt)4 | 1.63 | 0.87 | 0.13 |
| 26 | Zr | Zr(OEt)4 | 1.63 | 0.68 | 0.32 |
| 27 | Zr | Zr(OEt)4 | 1.82 | 0.72 | 0.28 |
| 28 | Zr | Zr(OEt)4 | 2.33 | 0.67 | 0.33 |
| 29 | Hf | Hf(OEt)4 | 0.9 | 0.75 | 0.25 |
| 30 | Hf | Hf(OEt)4 | 1 | 0.75 | 0.25 |
| 31 | Hf | Hf(OEt)4 | 1.1 | 0.67 | 0.33 |
| 32 | Hf | Hf(OEt)4 | 1.2 | 0.67 | 0.33 |
| 33 | Hf | Hf(OEt)4 | 1.3 | 0.67 | 0.33 |

TABLE 3

Bleached state voltage observed for various $Li_xNi_{1-y}M_yO_z$ anode films.

| Example No. | Composition | Bleached state voltage (V vs Li) |
|---|---|---|
| 34 | $Li_{0.91}Ti_{.05}Ni_{.95}$ | 1.90 |
| 6 | $Li_{0.91}Ti_{.09}Ni_{.91}$ | 1.92 |
| 7 | $Li_{0.91}Ti_{.14}Ni_{.86}$ | 2.38 |
| 35 | $Li_{0.91}Ti_{.24}Ni_{.76}$ | 2.65 |

TABLE 4

Thin-film XRD diffractions for selected $Li_xM_yNi_{1-y}O_z$ anode films.

| Group | Composition | 2θ (below 50°)* |
|---|---|---|
| 36 | $Li_1Zr_{0.1}Ni_{0.9}$ | 18.6, 37.6, 43.6 |
| 37 | $Li_1Zr_{0.5}Ni_{0.5}$ | 21.3, 37.8, 43.2 |
| 38 | $Li_1Hf_{0.1}Ni_{0.9}$ | 18.4, 37.8, 43.6 |
| 39 | $Li_1Hf_{0.33}Ni_{0.67}$ | 21.3, 38.6, 42.9 |
| 11 | $Li_{0.33}Ti_{0.667}Ni_{0.33}$ | 18.1, 35.6, 43.4 |

*XRD diffraction peaks of $Li_2CO_3$ and FTO substrates are omitted from the 2θ list.

TABLE 5

Measured carbon concentration in the calcined $Li_xNi_{1-y}M_yO_z$ films.

| Composition | Carbon concentration (atoms/cm3) | Estimated Carbon content in the oxide film (wt %)* |
|---|---|---|
| $Li_{0.33}Ti_{0.667}Ni_{0.33}$ | 3E+21 | 0.8-2 |

*Atomic density of metal oxide film was assumed as the range of 4-7 g/cm$^3$ based on crystal density of bulk metal oxides at 25° C.

Examples 40 through 43

$Li_xNi_{1-y-y'-y''-y'''}M_yM'_{y'}M''_{y''}M'''_{y'''}O_z$ Anode Films with Various Compositions Solution preparation, spin-coating and thermal processing methods for $Li_xNi_{1-y-y'-y''-y'''}M_yM'_{y'}M''_{y''}M'''_{y'''}O_z$ anode films are same as Example 4-39, with the molar ratios of each metal component in the $Li_xNi_{1-y-y'-y''-y'''}M_yM'_{y'}M''_{y''}M'''_{y'''}O_z$ anode films presented in Table 6. Electrochemical and optical measurements also were performed in the same methods as described in Examples 4-39.

Measured thickness for all the films of $Li_xNi_{1-y-y'-y''-y'''}M_yM'_{y'}M''_{y''}M'''_{y'''}O_z$ shown in Table 5 were found in the range of 132-222 nm. Measured charge capacity data were found in the range of 8-15 mC/cm$^2$ at the given voltage range, and the films switched from a bleached state transmission in the range of 83-89% to a dark state transmission in the range of 34-51% (at 550 nm). Absolute coloration efficiency was in the range of 24-32 cm$^2$/C for all the films in Table 6.

TABLE 6

Various compositions of $Li_xNi_{1-y-y'-y''-y'''}M_yM'_{y'}M''_{y''}M'''_{y'''}O_z$ anode films where M, M' and M'' are among group(IV) metals.

| Example No. | M | M' | M'' | M''' | Li (x) | Ni (1-y-y'-y''-y''') | M (y) | M' (y') | M'' (y'') | M''' (y''') |
|---|---|---|---|---|---|---|---|---|---|---|
| 40 | Ti | Hf | Zr | Nb | 1.26 | 0.65 | 0.107 | 0.107 | 0.107 | 0.029 |
| 41 | Ti | Hf | Zr | W | 1.26 | 0.65 | 0.107 | 0.107 | 0.107 | 0.029 |
| 42 | Ti | Hf | Zr | Al | 1.26 | 0.65 | 0.107 | 0.107 | 0.107 | 0.029 |
| 43 | Ti | Hf | Zr | V | 1.26 | 0.65 | 0.107 | 0.107 | 0.107 | 0.029 |

Examples 44 Through 47

Devices Assembled by WO$_3$ Cathode and Anode Films with Various Compositions Five layer devices were assembled using fully calcined anode films on FTO substrates (active area ~90 mm2) and tungsten oxide based cathodes, prepared on FTO substrates via known procedures (active area from ~90 to 260 mm$^2$). In an inert glove box, the cathode containing substrates were placed on a preheated hotplate set to 90° C. and 175 uL of an electrolyte precursor solution was deposited onto the surface. The electrolyte precursor solution consisted of 3 parts by weight 25% poly(methyl methacrylate) in dimethylcarbonate to one part by weight 1M lithium bis(trifluoromethylsulfonyl)imide in propylene carbonate. The electrolyte precursor solution on the cathode substrate was allowed to dry for 15 min and then, near the edge of the substrate, 4 polyimide shims of 100 microns thickness and ~2 mm width were placed such that they were above the substrate surface protruding in ~2 mm. The anode containing substrate was then placed upon the electrolyte with an overlap of ~260 mm2 relative to the cathode containing substrate. The entire assembly was laminated at 90° C. for 10 min under vacuum at a pressure of ~1 atm. After lamination, the shims were removed and contacts were applied to each electrode substrate using metal clips. The assembled device was then transferred into an encapsulation fixture and encapsulated with epoxy (Loctite E-30CL) such that only the contacts and an optical window remain unencapsulated. After the encapsulant hardened (~16 hrs) the devices were measured in a two electrode electrochemical setup combined with an optical light source and spectrometer. Data were obtained by sequential oxidation and reduction under potentiostatic control cycling voltage between 1.7 and −0.9 V, the anode being connected to the positive lead at 25° C. Cycles were switched when the absolute residual current fell below 5 microamps. Optical data were recorded every 1-5 s. The anode and cathode compositions in the devices along with the electro-chromic data after 10 cycles at 25° C. are shown in Table 7.

TABLE 7

Various five-layer electrochromic devices, and their electrochromic data after 10 cycles at 25° C.

| Example No. | Anode Composition | Cathode Composition | Q (mC/cm2) | $T_{clear}$ (%) | $T_{dark}$ (%) |
|---|---|---|---|---|---|
| 44 | Li$_{1.26}$Ti$_{0.107}$Hf$_{0.107}$Zr$_{0.107}$Ni$_{0.65}$Nb$_{0.029}$ | WO$_3$ | 9.4-17 | 67-71 | 5.6-22 |
| 45 | Li$_{1.26}$Ti$_{0.107}$Hf$_{0.107}$Zr$_{0.107}$Ni$_{0.65}$V$_{0.029}$ | WO$_3$ | | | |
| 46 | Li$_{1.26}$Ti$_{0.107}$Hf$_{0.107}$Zr$_{0.107}$Ni$_{0.65}$Al$_{0.029}$ | WO$_3$ | | | |
| 47 | Li$_{1.26}$Ti$_{0.107}$Hf$_{0.107}$Zr$_{0.107}$Ni$_{0.65}$W$_{0.029}$ | WO$_3$ | | | |

What is claimed is:

1. A multi-layer electrochromic device comprising a layer of a lithium nickel oxide composition on a first substrate, the lithium nickel oxide composition comprising lithium, nickel, and at least one-metal selected from the group consisting of titanium, zirconium, and hafnimn, the lithium nickel oxide composition being characterized by a largest d-spacing of at least 2.5 A ; and wherein the lithium nickel oxide composition exhibits long range ordering as measured by the presence of at least one reflection peak in the XRD pattern below 26 degrees (20) when measured with copper Kα radiation.

2. The multi-layer electrochromic device of claim 1 wherein the lithium nickel oxide composition comprises titanium.

3. The multi-layer electrochromic device of claim 1 wherein (i) the atomic ratio of lithium to the combined amount of nickel and titanium in the lithium nickel oxide composition is at least 0.4:1, respectively, and (ii) the atomic ratio of the amount of titanium to the combined amount of nickel and titanium in the lithium nickel oxide composition is about 0.025:1 to about 0.8:1, respectively.

4. The multi-layer electrochromic device of claim 3 wherein the atomic ratio of lithium to the combined amount of nickel and titanium in the lithium nickel oxide composition is in the range about 0.75:1 to about 3:1, respectively.

5. The multi-layer electrochromic device of claim 3 wherein the atomic ratio of titanium to the combined amount of nickel and titanium in the lithium nickel oxide composition is in the range of about 0.1:1 and about 0.6:1, respectively.

6. The multi-layer electrochromic device of claim 1 wherein the lithium nickel oxide composition comprises zirconium.

7. The multi-layer electrochromic device of claim 1 wherein the atomic ratio of lithium to the combined amount of nickel and zirconium in the lithium nickel oxide composition is at least 0.4:1, respectively, and (ii) the atomic ratio of the amount of zirconium to the combined amount of nickel and zirconium in the lithium nickel oxide composition is about 0.025:1 to about 0.8:1, respectively.

8. The multi-layer electrochromic device of claim 7 wherein the atomic ratio of lithium to the combined amount of nickel and zirconium in the lithium nickel oxide composition is in the range of about 0.75:1 to about 3:1, respectively.

9. The multi-layer electrochromic device of claim 7 wherein the atomic ratio of zirconium to the combined amount of nickel and zirconium in the lithium nickel oxide composition is in the range of about 0.1:1 and about 0.6:1, respectively.

10. The multi-layer electrochromic device of claim 1 wherein the lithium nickel oxide composition comprises hafnium.

11. The multi-layer electrochromic device of claim 10 wherein the atomic ratio of lithium to the combined amount of nickel and hafnium in the lithium nickel oxide composition is at least 0.4:1, respectively, and (ii) the atomic ratio of the amount of hafnium to the combined amount of nickel and hafnium in the lithium nickel oxide composition is about 0.025:1 to about 0.8:1, respectively.

12. The multi-layer electrochromic device of claim 11 wherein the atomic ratio of lithium to the combined amount of nickel and hafnium in the lithium nickel oxide composition is in the range of about 0.75:1 to about 3:1, respectively.

13. The multi-layer electrochromic device of claim 11 wherein the atomic ratio of hafnium to the combined amount of nickel and hafnium in the lithium nickel oxide composition is in the range of about 0.1:1 and about 0.6:1, respectively.

14. The multi-layer electrochromic device of claim 1 wherein (i) the atomic ratio of lithium to the combined amount of nickel, titanium, zirconium and hafnium in the lithium nickel oxide composition is at least 0.4:1, respectively, and (ii) the atomic ratio of the combined amount of titanium, zirconium and hafnium to the combined amount of nickel, titanium, zirconium and hafnium in the lithium nickel oxide composition is about 0.025:1 to about 0.8:1, respectively.

15. The multi-layer electrochromic device of claim 14 wherein the atomic ratio of lithium to the combined amount of nickel, titanium, zirconium and hafnium in the lithium nickel oxide composition is in the range about 0.75:1 to about 3:1, respectively.

16. The multi-layer electrochromic device of claim 14 wherein the atomic ratio of the combined amount of titanium, zirconium and hafnium to the combined amount of nickel, titanium, zirconium and hafnium in the lithium nickel oxide composition is in the range of about 0.1:1 and about 0.6:1, respectively.

17. The multi-layer electrochromic device of claim 1 wherein (i) the lithium nickel oxide composition comprises at least one bleached state stabilizing element selected from the group consisting of Y, V, Nb, Ta, Mo, W, B, Al, Ga, In, Si, Ge, Sn, P, and Sb, (ii) the atomic ratio of lithium to the combined amount of nickel, titanium, zirconium, hafnium and the bleached state stabilizing element(s) in the lithium nickel oxide composition is at least 0.4:1, respectively, and (iii) the atomic ratio of the combined amount of titanium, zirconium, hafnium and the bleached state stabilizing element(s) to the combined amount of nickel, titanium, zirconium, hafnium and the bleached state stabilizing elements in the lithium nickel oxide composition is about 0.025:1 to about 0.8:1, respectively.

18. The multi-layer electrochromic device of claim 17 wherein the atomic ratio of lithium to the combined amount of nickel, titanium, zirconium, hafnium and the bleached state stabilizing element(s) in the lithium nickel oxide composition is in the range about 015:1 to about 3:1, respectively.

19. The multi-layer electrochromic device of claim 17 wherein the atomic ratio of the combined amount of titanium, zirconium, hafnium and the bleached state stabilizing elements to the combined amount of nickel, titanium, zirconium, hafnium and the bleached state stabilizing element(s) in the lithium nickel oxide composition is in the range of about 0.1:1 and about 0.6:1, respectively.

20. The multi-layer electrochromic device of claim 1 wherein the lithium nickel oxide composition layer has an average thickness between 25 nm and 2,000 nm.

21. The multi-layer electrochromic device of claim 1 wherein the first substrate comprises glass, plastic, metal, or metal-coated glass or plastic.

22. The multi-layer electrochromic device of claim 1 wherein the multi-layer device further comprises a first transparent conductive oxide layer and the first transparent conductive oxide layer is between the lithium nickel oxide composition layer and the first substrate.

23. The multi-layer electrochromic device of claim 1 wherein the lithium nickel oxide composition comprises at least 0.05 wt. % carbon.

24. The multi-layer electrochromic device of claim 1 wherein the lithium nickel oxide composition has a bleached state voltage of at least 2V.

25. A multi-layer electrochromic device of claim 1 wherein the multi-layer device further comprises a second substrate, a first electrically conductive layer, a second electrically conductive layer, a cathode layer, and an ion conductor layer, wherein the first electrically conductive layer is between the first substrate and the lithium nickel oxide layer, the lithium nickel oxide layer is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer.

26. A multi-layer electrochromic device comprising:

a first substrate;

a first electrically conductive layer;

a layer of a lithium nickel oxide composition, the lithium nickel oxide composition comprising lithium, nickel, and at least one metal selected from the group consisting of titanium, zirconium, and hafnium, the lithium nickel oxide composition being characterized by a largest d-spacing of at least 2.5 Å and at least one reflection peak in the XRD pattern below 26 degrees (2θ) when measured with copper Kα radiation;

an ion conductor layer;

a cathode layer;

a second electrically conductive layer; and a second substrate, wherein the first electrically conductive layer is between the first substrate and the layer of lithium nickel oxide composition, the layer of lithium nickel oxide composition is between the first electrically conductive layer and the ion conductor layer, the second electrically conductive layer is between the cathode layer and the second substrate, the cathode layer is between the second electrically conductive layer and the ion conductor layer, and the ion conductor layer is between the cathode layer and the lithium nickel oxide anode layer.

27. A multi-layer electrochromic device comprising:

a first substrate;

a first electrically conductive layer;

a layer of a lithium nickel oxide composition, the lithium nickel oxide composition comprising lithium, nickel, and at least one metal selected from the group consisting of titanium, zirconium, and hafnium, wherein (i) the atomic ratio of lithium to the combined amount of nickel, titanium, zirconium, and hafnium in the lithium nickel oxide composition is at least 0.4:1, respectively, and (ii) the atomic ratio of the amount of the combined amount of titanium, zirconium, and hafnium to the combined amount of nickel, titanium, zirconium, and hafnium in the lithium nickel oxide composition is about 0.025:1 to about 0.8:1, respectively, wherein the lithium nickel oxide composition is characterized by a largest d-spacing of at least 2.5 Å;

an ion conductor layer;

a cathode layer;

a second electrically conductive layer; and a second substrate.

* * * * *